(12) United States Patent
Taverner

(10) Patent No.: US 8,379,297 B2
(45) Date of Patent: Feb. 19, 2013

(54) WAVELENGTH SWEPT LIGHT SOURCE AND FILTER BASED ON SWEEP FUNCTION, AND ITS METHOD OF OPERATION

(75) Inventor: Domino Taverner, Wallingford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 460 days.

(21) Appl. No.: 12/686,941

(22) Filed: Jan. 13, 2010

(65) Prior Publication Data
US 2010/0128348 A1 May 27, 2010

Related U.S. Application Data

(63) Continuation-in-part of application No. 12/541,770, filed on Aug. 14, 2009, which is a continuation-in-part of application No. 11/755,131, filed on May 30, 2007.

(60) Provisional application No. 60/803,470, filed on May 30, 2006.

(51) Int. Cl.
*H01S 5/00* (2006.01)
*H01S 3/10* (2006.01)

(52) U.S. Cl. .......................................... 359/333; 372/25
(58) Field of Classification Search ................... 359/333; 372/25
See application file for complete search history.

(56) References Cited

U.S. PATENT DOCUMENTS

| 5,748,312 A * | 5/1998 | Kersey et al. ................ 356/478 |
| 6,816,515 B1 * | 11/2004 | Yun et al. ........................ 372/18 |
| 6,901,087 B1 * | 5/2005 | Richardson et al. ............ 372/20 |
| 2006/0187537 A1 | 8/2006 | Huber et al. | |
| 2007/0058897 A1 * | 3/2007 | Yong et al. ...................... 385/12 |

OTHER PUBLICATIONS

R. Huber et al., "Fourier Domain Mode Locking (FDML): A new laser operating regime and applications for optical coherence tomography," Optics Express, Apr. 2006 vol. 14(8): pp. 3225-3237.

* cited by examiner

*Primary Examiner* — Eric Bolda
(74) *Attorney, Agent, or Firm* — Patterson & Sheridan, LLP

(57) ABSTRACT

Methods and apparatus for the active control of a wavelength-swept light source used to interrogate optical elements having characteristic wavelengths distributed across a wavelength range are provided.

25 Claims, 15 Drawing Sheets

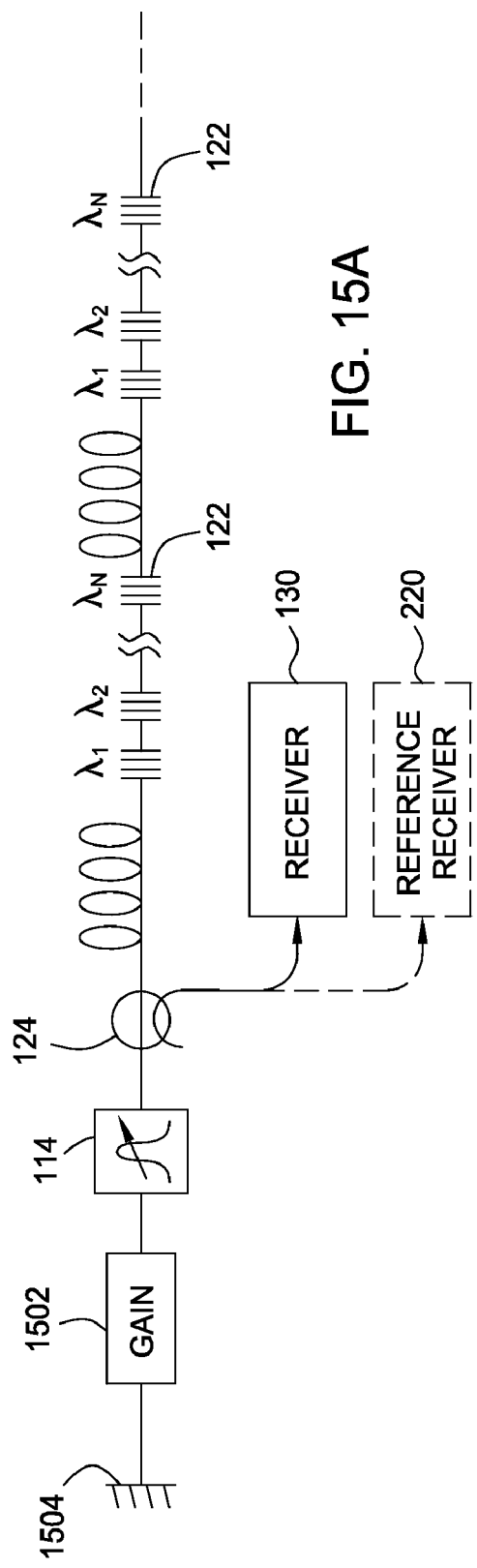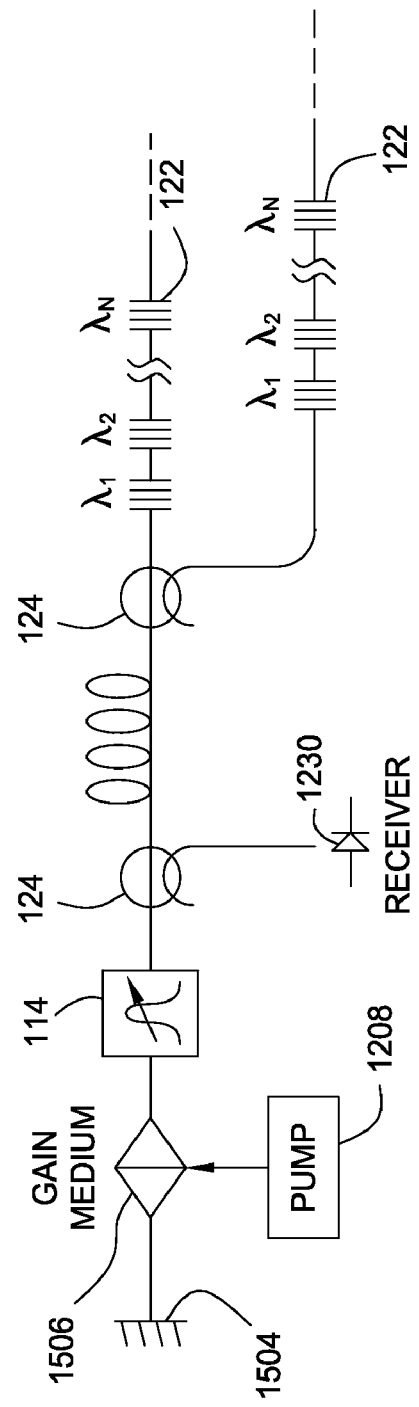
FIG. 15A
FIG. 15B

WAVELENGTH SWEPT LIGHT SOURCE AND FILTER BASED ON SWEEP FUNCTION, AND ITS METHOD OF OPERATION

CROSS-REFERENCE TO RELATED APPLICATIONS

This application is a continuation-in-part of U.S. patent application Ser. No. 12/541,770 filed Aug. 14, 2009, which is a continuation-in-part of U.S. patent application Ser. No. 11/755,131 filed May 30, 2007, which claims benefit of U.S. Provisional Patent Application Ser. No. 60/803,470, filed May 30, 2006, which are herein incorporated by reference.

BACKGROUND OF THE INVENTION

1. Field of the Invention

Embodiments of the present invention generally relate to determination of a characteristic wavelength of an optical component and, more particularly, to techniques and apparatus for controlling the manner in which a spectral bandwidth is swept in an effort to determine the characteristic wavelength.

2. Description of the Related Art

Many optical components have a characteristic wavelength that may be found by interrogating the optical component with an optical source capable of producing light at various wavelengths over a fixed range or bandwidth. For example, Bragg gratings (typically formed by photo-induced periodic modulation of the refractive index of an optical waveguide core) are highly reflective to light having wavelengths within a narrow bandwidth centered at a wavelength generally referred to as the Bragg wavelength. Because light having wavelengths outside this narrow bandwidth is passed without reflection, Bragg wavelengths can be determined by interrogating a Bragg grating with a light source swept across a bandwidth that includes the Bragg wavelength and monitoring the reflected optical power spectrum at a receiver unit. Because Bragg wavelengths are dependent on physical parameters, such as temperature and strain, Bragg gratings can be utilized in optical sensor systems to measure such parameters.

In these and a wide range of other types of optical systems, the measurement of a characteristic wavelength of an optical component to great accuracy (and/or with great repeatability) is important to system performance. Two significant parameters determining the error of any such measurement are the signal to noise ratio (SNR) and effective integration time of the measuring system. SNR is dependent of many factors including received optical power, optical-source noise, and receiver noise. The effective integration time is dependent on overall averaging time and the proportion of that time which is producing useful signals at the receiver unit. Improving these two parameters can improve characteristic wavelength measurement repeatability and accuracy.

In a typical system, with a fixed spectral bandwidth sweep, a large percentage of the interrogation time is spent covering wavelengths where no useful signal is returned by the optical element under test. This may be particularly true in the case where multiple elements (e.g., multiple Bragg gratings disposed serially on a common fiber) are combined in a commonly used wavelength-division multiplexing (WDM) scheme. In these arrangements, wavelength guard-bands are typically required between the spectral features of elements, for example, to ensure the elements have non-overlapping spectral features over the entire expected measurement range and even as some movement in the spectral features may be expected over time. These guard-bands increase the total range of wavelengths scanned, thereby increasing the amount of interrogation time spent covering wavelengths that produce no useful signal.

Accordingly, techniques and systems that optimize the useful received signal, reduce SNR, and reduce the total amount of interrogation time would be desirable.

SUMMARY OF THE INVENTION

Embodiments of the present invention generally provide methods and apparatus for interrogating sensors elements having characteristic wavelengths spread across a wavelength range.

One embodiment of the present invention is a method. The method generally includes filtering light emitted from an amplified spontaneous emission (ASE) source, amplifying the filtered light, and interrogating one or more optical elements with the amplified light to measure one or more parameters.

Another embodiment of the present invention provides an apparatus for interrogating one or more optical elements. The apparatus generally includes an ASE source for emitting light, a filter for filtering the light emitted by the ASE source, and an amplifier for amplifying the filtered light, such that the amplified light is used to interrogate the optical elements.

Yet another embodiment of the present invention is a method. The method generally includes providing light, wherein a wavelength of the light is changed according to a sweep function; interrogating one or more reflective optical elements with the wavelength-swept light to produce reflected optical signals; filtering the reflected optical signals, wherein a bandpass wavelength range is changed based on the sweep function to follow the changes in the light's wavelength; and receiving the filtered, reflected optical signals for processing.

Yet another embodiment of the present invention provides an apparatus. The apparatus generally includes a light source configured to change a wavelength of the light according to a sweep function; one or more reflective optical elements configured to receive the wavelength-swept light from the light source and to reflect portions of the light at characteristic wavelengths producing reflected optical signals; a tunable bandpass filter configured to filter the reflected optical signals, wherein a bandpass wavelength range of the filter is changed based on the sweep function to follow the changes in the light's wavelength; and a receiver for processing the filtered, reflected optical signals.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 15A-B illustrate exemplary reflective optical sensor systems for swept-wavelength interrogation with a tunable filter located in the effective cavity of the light source in an effort to filter out reflected signals that do not arise from the wavelength and time slot of interest during a sweep;

DETAILED DESCRIPTION

Embodiments of the present invention provide for the active control of a light source used to interrogate optical elements having characteristic wavelengths distributed across a wavelength range.

For some embodiments, this active control may include varying sweep rates across different ranges. For example, a sweep rate may be reduced in ranges containing spectral features of interest, allowing more measurements, which may lead to increased resolution. On the other hand, the sweep rate may also be increased in order to skip, or otherwise move rapidly through, other ranges (e.g., ranges absent features of interest or ranges corresponding to measured parameters that do not require as high resolution as others or as frequent measurements). Further, for some embodiments, particular ranges (sweep bands) may be adjusted, for example, to follow features of interest as they shift (e.g., change in wavelength) over time.

Different embodiments of the present invention may utilize wavelength sweep control described herein in systems utilizing transmissive or reflective type sensors. Further, embodiments of the present invention may be applied in a number of different sensing applications, including, but not limited to, industrial applications, downhole applications (e.g., in wellbore sensing applications), and subsea applications (e.g., ocean bottom seismic sensing applications).

An Exemplary System

Figure 1A:
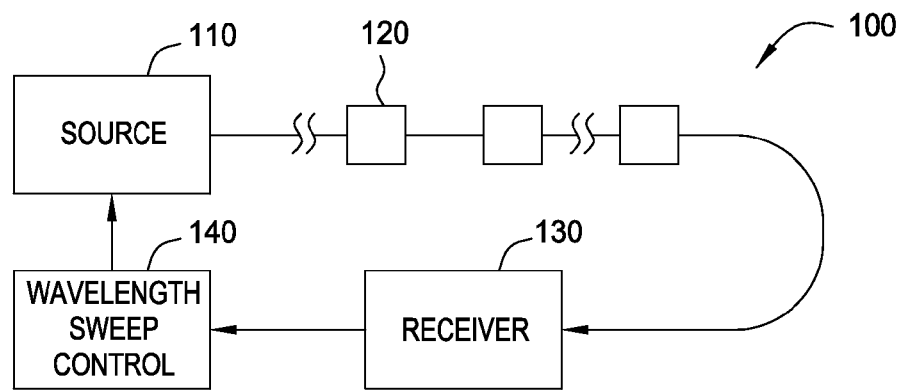
FIG. 1A illustrates an exemplary transmissive optical sensor system with wavelength sweep control.

FIG. 1A illustrates an exemplary optical sensor system 100 utilizing wavelength sweep control in accordance with one embodiment of the present invention. As illustrated, the system 100 may include a swept-wavelength optical source 110, one or more transmissive optical elements 120 having one or more spectral features of interest (e.g., a characteristic wavelength), and a sweep control unit 140.

The swept-wavelength optical source 110 produces optical radiation at wavelengths and over wavelength ranges (bandwidths) under the control or influence of the sweep control unit 140. The elements 120 may be interrogated with optical radiation from the optical source 110 that is swept across a spectral range including the spectral features of interest. The elements 120 may be sensitive to parameters (e.g., temperatures, pressures and strain) that effect the attenuation of particular wavelengths of light transmitted through the elements 120 in a known manner.

Figure 2:
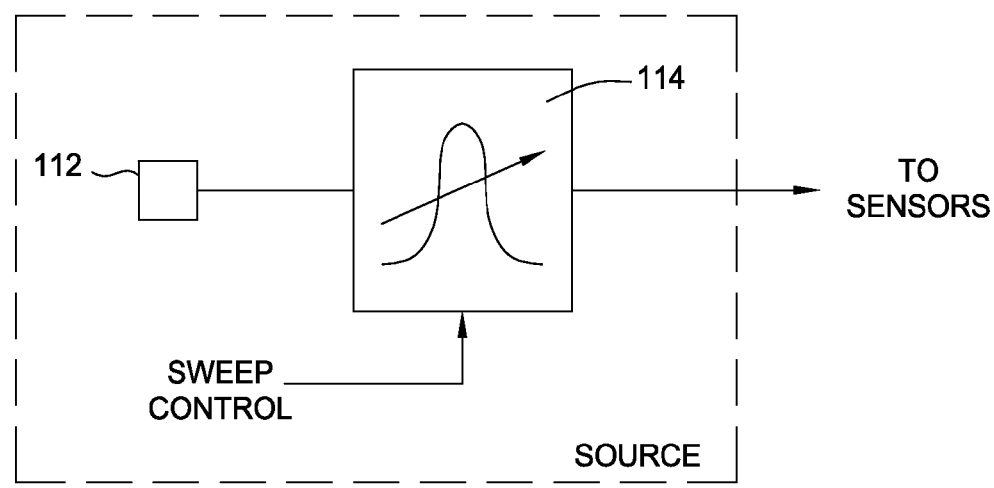
FIG. 2 illustrates an exemplary wavelength sweeping optical source utilizing a tunable filter.

As illustrated in FIG. 2, one embodiment of the optical source 110 may include a broadband source 112 and a tunable filter 114 that may be controlled by the sweep control unit 140. For example, the sweep control unit 140 may control the tunable filter 114 to adjust a wavelength range (or band) to pass with little or no attenuation while blocking wavelengths outside the range. For other embodiments, the optical source 110 may include a light source that can be controlled to generate optical signals of different wavelengths, such as a tunable laser.

Referring back to FIG. 1A, a receiver 130 may include any suitable combination of optical, opto-electronic, and electronic components to process light signals transmitted through the elements 120. Thus, the receiver 130 may be able to generate information about the corresponding parameters, based on the spectral information extracted from the received light. The receiver 130 may include any suitable combination of components that converts optical signals to electrical signals, integrates, filters and produces characteristic wavelength determinations. As an example, for one embodiment, the receiver may include an optical PIN diode, transimpedance amplifier, analog filter, analog-to-digital converter, digital filter and processing unit (e.g., an embedded processor, industrial or personal computer) for wavelength determination.

Figure 3:
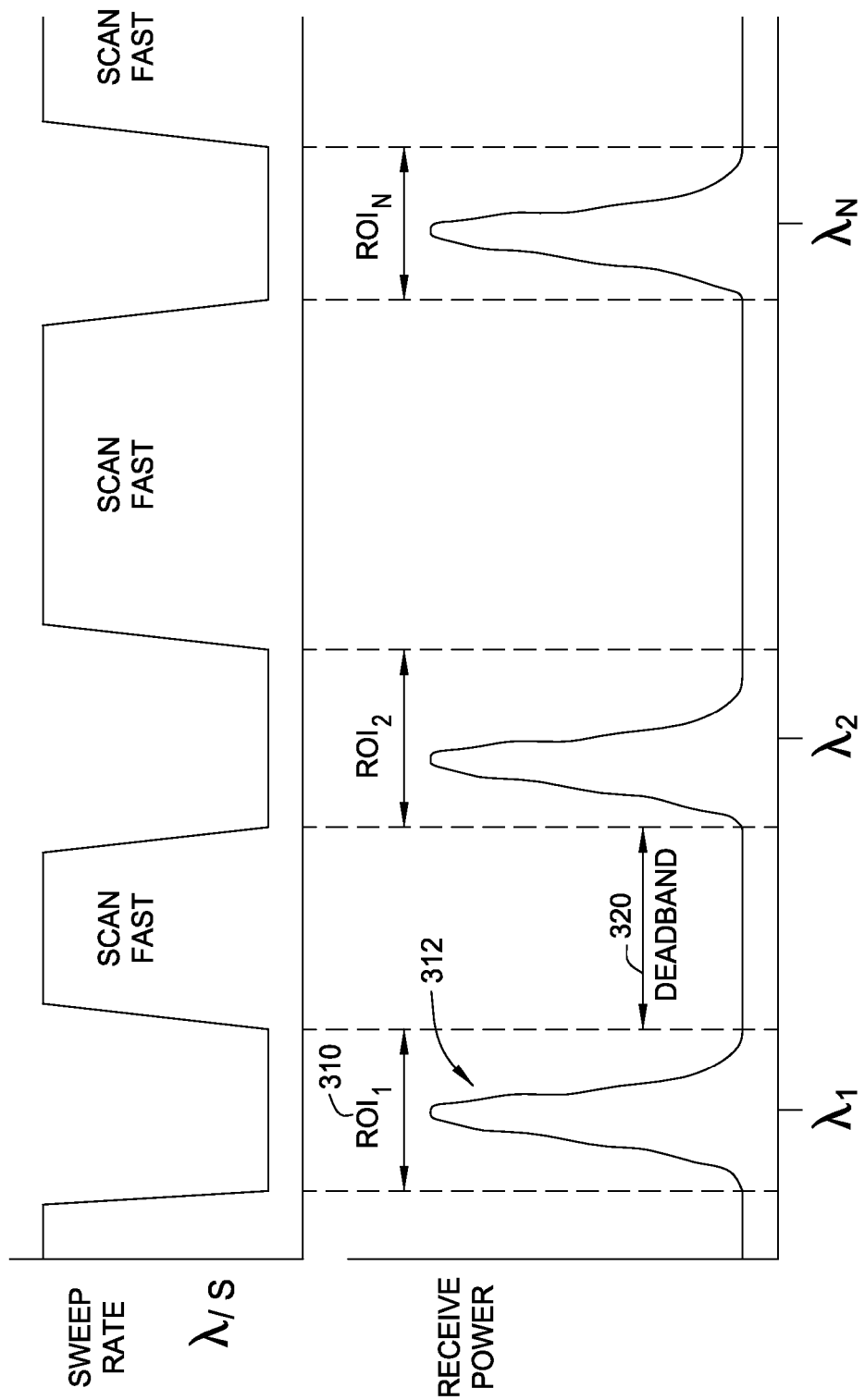
FIG. 3 illustrates how sweep rates may be varied for different wavelength regions of interest in accordance with embodiments of the present invention.

As illustrated, the sweep control unit 140 may receive, as input, one or more signals from one or more points in the receiver 130 and, in response, may output signals that influence the sweep of the optical source 110. Examples of typical parameters that the sweep control unit may influence include, but are not limited to, source wavelength, source wavelength sweep range, sweep rate, and/or source optical output power. These influences may include discontinuous or continuous changes in such parameters, for example, multiple sweep bands (FIG. 3). The sweep control unit signals can influence a sweep as it is in progress and/or influence future sweeps, as will be described in greater detail below.

The sweep control unit 140 may be implemented using any suitable processing logic, such as an embedded controller, a programmable logic controller (PLC) or personal computer (PC). While shown as a separate component in the Figures, for some embodiments, the sweep control unit 140 may be integrated into, or be an integral function of the receiver 130, source 110, and/or both.

Figure 1B:
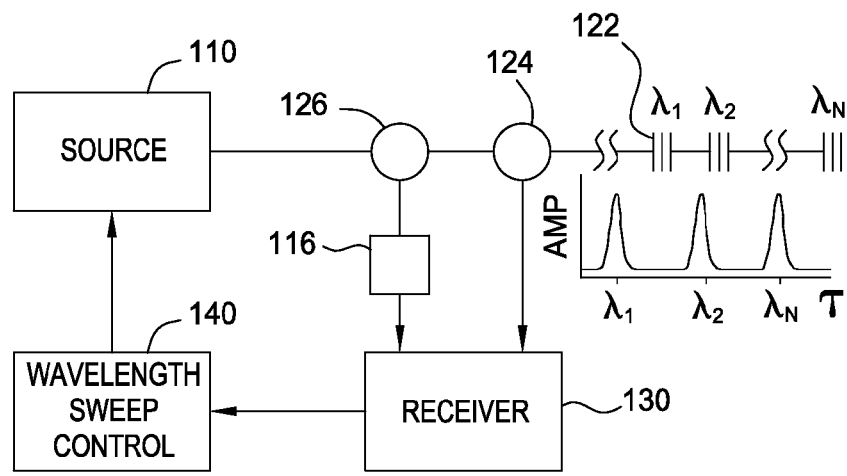
FIG. 1B illustrates an exemplary reflective optical sensor system with wavelength sweep control.

As illustrated in FIG. 1B, similar techniques may be applied to a system utilizing reflective sensor elements 122, such as Bragg gratings, with the spectral feature of the light reflected dependent upon a sensed parameter. Each Bragg grating 122 may be interrogated by sweeping across a corresponding wavelength range chosen to contain the characteristic wavelength $\lambda$, accounting for the maximum deviations in center wavelengths (areas of peak reflection) expected over the entire range of measured parameters and over time. During this interrogation, response signals are monitored by the receiver 130 in order to make characteristic wavelength determinations.

Interrogating optical signals from the source 110 may be directed to the gratings 122 via a bi-direction coupler 124 that also directs reflected response signals to the receiver 130. A splitter 126 may also direct a portion of the interrogating optical signals to a reference element 116, allowing the receiver 130 to monitor optical signals produced by the optical source 110 (e.g., the actual wavelength and power).

As previously described, wavelength division multiplexed (WDM) systems, such as the system 100 typically have deadbands between sensor wavelengths, to ensure non-overlapping characteristic wavelengths. In conventional systems, these deadbands add to the total swept wavelength range, thereby increasing overall interrogation time and decreasing the percentage of this time a useful response signal is produced. However, embodiments of the present invention may increase the percentage of time spent producing useful response signals by skipping these deadbands or at least increasing the sweep rate to rapidly sweep through them.

Varying Sweep Rates

FIG. 3 illustrates an exemplary spectral response for a system (power of received response signals versus wavelength), with multiple swept ranges 310 containing spectral features of interest 312. As illustrated, regions of interest may be scanned with a first (relatively slow) scan rate, while deadbands 320 may be scanned with a second (relatively faster) scan rate or skipped altogether. For some embodiments, for example, due to limited response time of the source 110 (e.g., due to physical, mechanical, or electrical limitations), it may not be possible to entirely skip a wavelength range and therefore deadbands may be swept with increased sweep rate (relative to the ranges of interest 310).

In either case, controlling the sweep rate in this manner may increase the useful optical energy received from the optical elements in a given interrogation time. As a result, overall interrogation time may be reduced relative to conventional systems or, alternatively, more measurements may be taken in the same interrogation time, allowing an increased "focus" on ranges of interest, which may increase accuracy.

Different sweep rates may also be utilized for different ranges of interest, to interrogate different sensors at different rates, which may provide a great deal of flexibility in overall system design. For example, a first sensor (e.g., having a first characteristic wavelength $\lambda 1$) may be interrogated using a lower sweep rate than that used to interrogate a second sensor ($\lambda 2$). As a result, more measurements may be taken for the first sensor, which may be lead to higher accuracy measurements, while the second sensor may be used for more coarse measurements. Using this approach, some sensors may be designated as "high resolution" sensors and interrogated with lower sweep rates (sampled more often) than other sensors.

At a different point in time, it may become desirable to take higher accuracy measurements of the second sensor. Therefore, the sweep rates of different sensors may be changed from one sweep to the next. For example, for some applications, it may only be necessary to take highly accurate measurements of certain parameters in certain situations (e.g., when the parameter is changing rapidly, or has reached a particular threshold value). In some instances, high accuracy measurements (low sweep rate) of a particular parameter may only be made when a coarse measurement of the same parameter (taken in a current or previous sweep) indicates a particular value or range.

Figure 4:
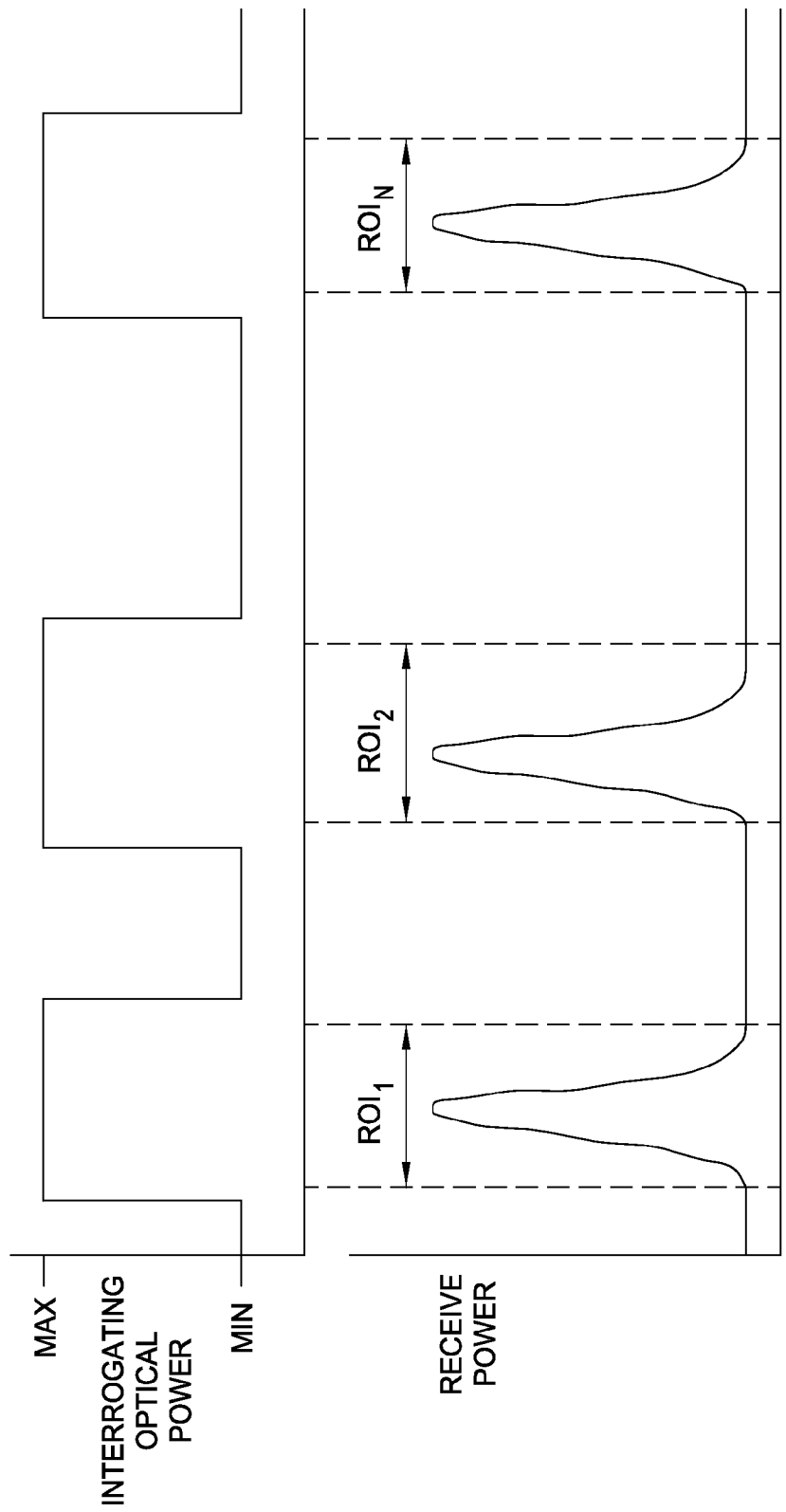
FIG. 4 illustrates how optical power may be varied for different wavelength regions of interest in accordance with embodiments of the present invention.

As illustrated in FIG. 4, for some embodiments, the optical power of interrogating light signals may also be varied for different swept ranges (as an alternative to, or in conjunction with, varying sweep rates). For example, optical power may be decreased when sweeping across dead ranges. This approach may allow optical power to be conserved. For some embodiments, reduced optical power may be used to scan particular swept ranges, until a particular threshold level of optical response signal is received.

Changes in the received power from the optical element (or optical system) could also be compensated for, by adjusting the source output power for example. As will be described in greater detail below, with reference to FIG. 9, monitoring response signals while quickly sweeping and/or interrogating with lowered optical power over particular swept ranges may be performed as part of a process to automatically "discover" a particular sensor topology.

Adjusting Ranges of Interest

Embodiments of the present invention may also allow for only a limited band of wavelengths directly surrounding particular spectral features of interest to be swept by the source. The wavelength sweep control unit may continuously adjust the swept bands/ranges to track these features, should they change in wavelength over time.

Figure 5:
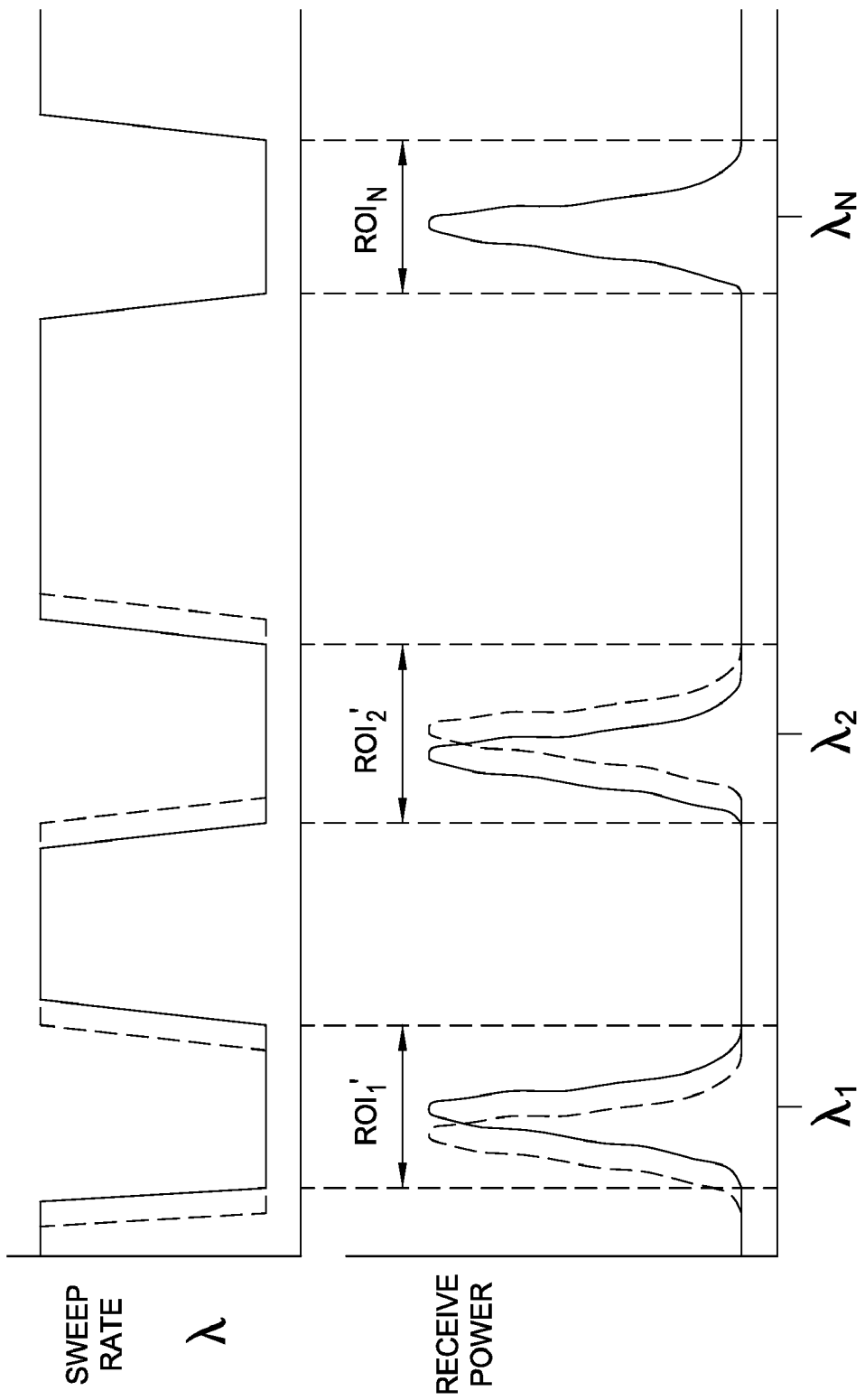
FIG. 5 illustrates how wavelength features of interest may shift over time and how sweep rates of corresponding wavelength regions may be adjusted accordingly.

For example, as illustrated in FIG. 5, the characteristic wavelength of a first sensor ($\lambda 1$) may change over time, such that the region of interest, defined by the expected deviation in wavelength of the sensor, may shift over time. A previous region of interest is shown as a dashed line, while the new region of interest is shown as a solid line. In the illustrated example, a positive shift for $\lambda 1$ is shown. As illustrated in the upper graph of FIG. 5, in response to this shift, the wavelength sweep control 140 may adjust the corresponding swept range (swept with a relatively low sweep rate and/or a relatively high optical power) for $\lambda 1$ to compensate for the shift. As illustrated, the characteristic frequency for a second sensor (λ2) may shift in the opposite direction, which may cause the wavelength sweep control 140 to adjust the corresponding swept range accordingly.

Figure 6:
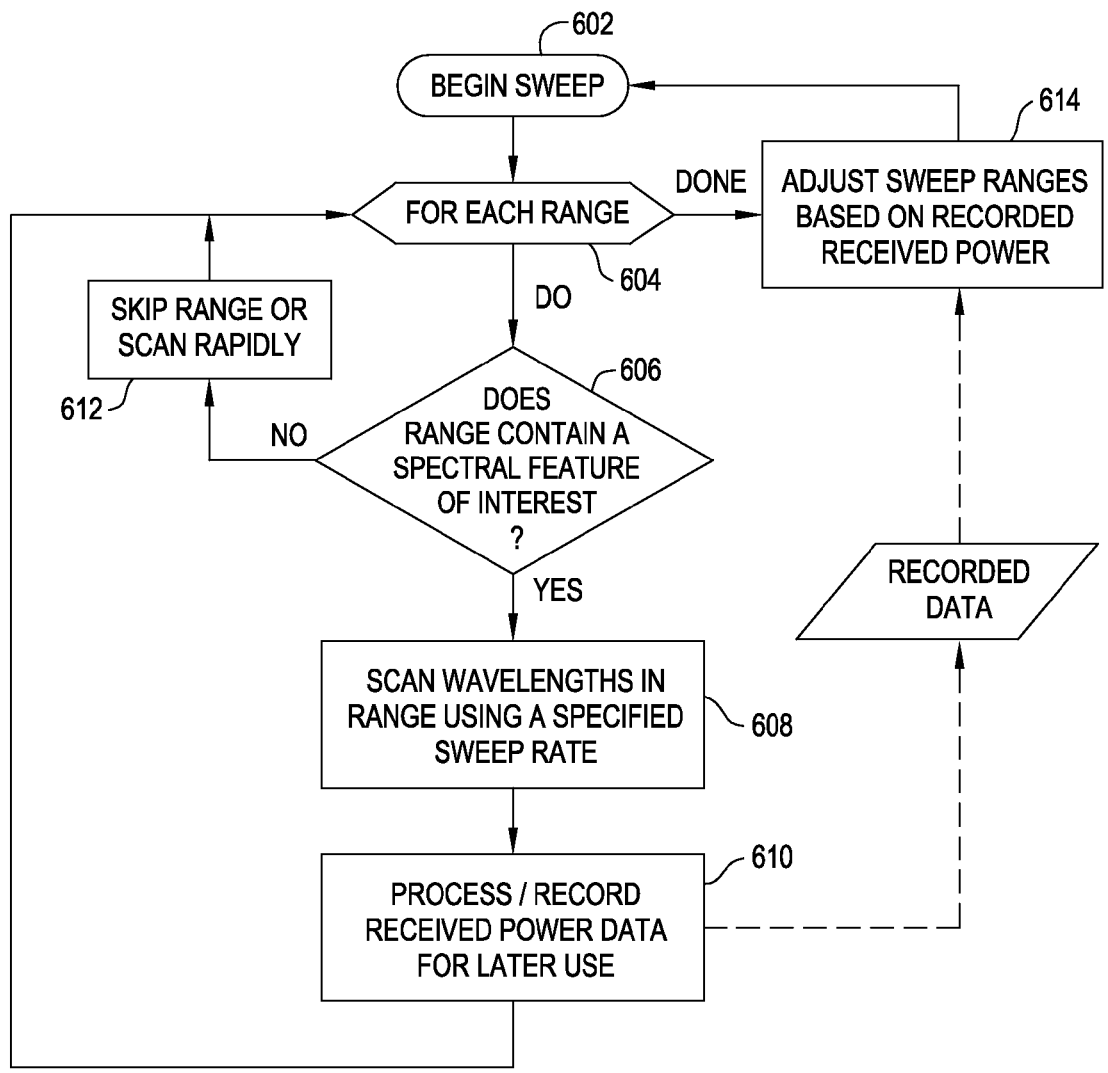
FIG. 6 is a flow diagram of exemplary operations for varying wavelength sweep parameters based on feedback from previous sweeps.

FIG. 6 is a flow diagram of exemplary operations that may be performed, for example, by the wavelength sweep control 140 to vary wavelength sweep parameters based on feedback from previous sweeps. At step 602, a sweep begins, for example by interrogating optical elements with light signals having a wavelength at a low end of a total range to be swept. As described above, the total range to be swept may be divided into ranges (e.g., ranges of interest and deadbands).

At step 604, a loop of operations is entered, to be performed for each range. At step 606, a determination is made as to if a current range contains a spectral feature of interest. If the current range does not contain a spectral feature of interest, the range can be skipped or, at least, scanned rapidly, at step 612. If the current range contains a spectral feature of interest, wavelengths in the range may be swept at a specified (relatively slow) sweep rate, at step 608. At step 610, the received power (response signal) may be recorded for later use.

The operations may be repeated (e.g., slowly sweeping ranges of interest and rapidly sweeping deadbands), until all ranges have been swept. At step 614, the swept ranges may be adjusted based on the recorded received power, for example, as described above with reference to FIG. 5. These adjusted swept ranges may then be used in a subsequent sweep. In this manner, the wavelength sweep control 140 may continuously adjust sweep parameters to compensate for changing sensor characteristics.

Figure 7:
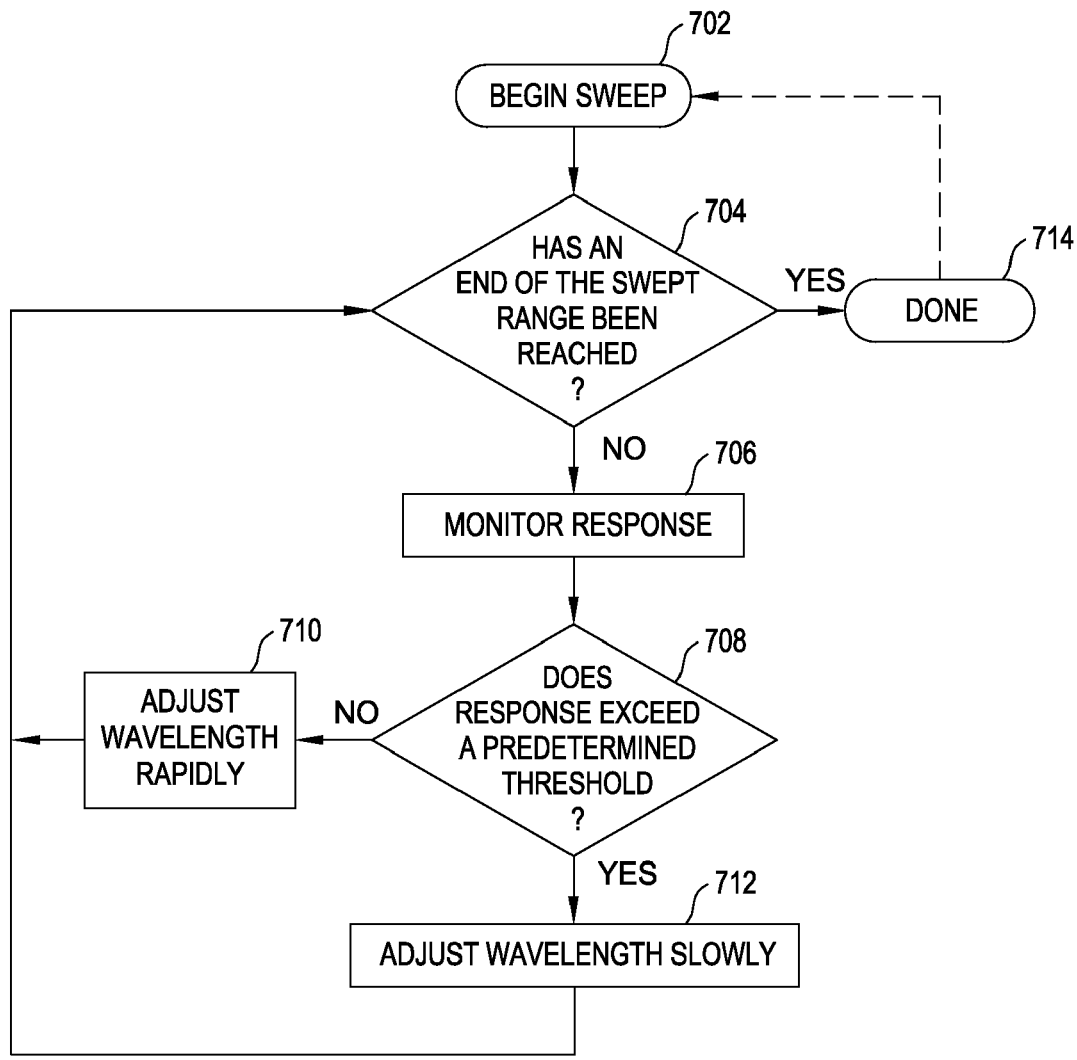
FIG. 7 is a flow diagram of exemplary operations for varying wavelength sweep parameters of a current sweep based on feedback.

FIG. 7 is a flow diagram of exemplary operations for varying wavelength sweep parameters of a current sweep based on feedback. The operations shown in FIG. 7 may be performed to sweep without using predefined sweep ranges, for example, by sweeping rapidly until some level of response signal is detected indicating a sensor region of interest has been reached. As an alternative, the operations of FIG. 7 may be performed with predefined sweep ranges, for example, in an effort to detect spectral information occurring in what was thought to be a deadband.

At step 702, a sweep begins. At step 706, the optical response is monitored. As long as the response does not exceed a predetermined threshold, as determined at step 708, the wavelength is adjusted rapidly. Once the response does exceed the predetermined threshold, the wavelength is adjusted slowly. These operations may repeat, until the end of a swept range has been reached, as determined at step 704. Thus, these operations may allow regions that contain no spectral feature of interest (as evidenced by a lack of response signal) to be quickly scanned.

Figure 8:
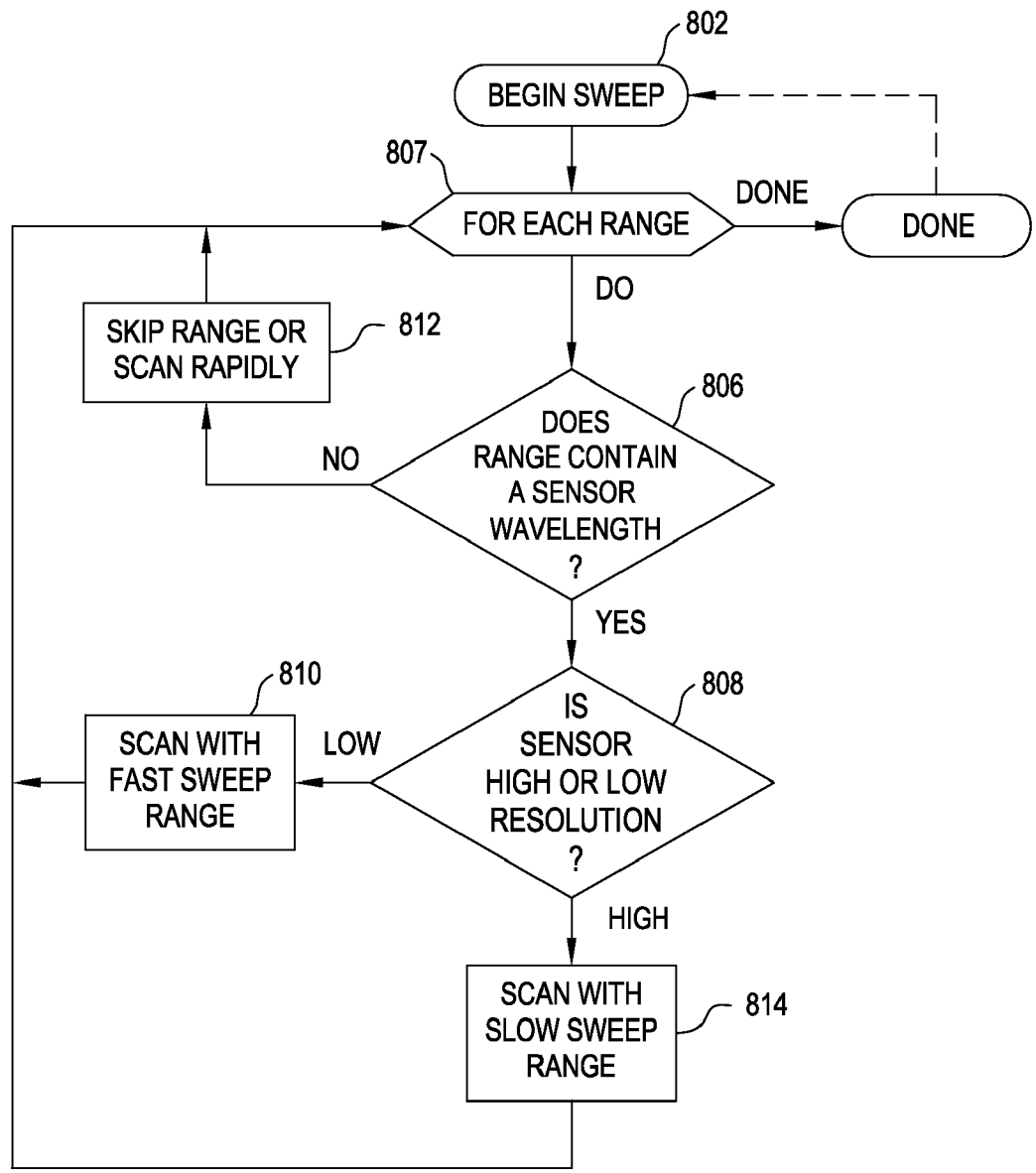
FIG. 8 is a flow diagram of exemplary operations for varying sweep rates based on specified sensor resolutions.

FIG. 8 is a flow diagram of exemplary operations for varying sweep rates based on specified sensor resolutions. As previously described, some sensors may be identified as high resolution sensors that may be scanned slower (allowing more samples to be taken) or that may be scanned with interrogating signals having higher optical power. Other sensors, identified as low-resolution sensors may be scanned more rapidly (although not as quickly as a deadband) or that may be scanned with interrogating signals having relatively lower optical power.

At step 802, a sweep begins and, at step 804, a loop of operations is entered, to be performed for each range. At step 806, a determination is made as to if a current range contains a characteristic wavelength of a corresponding sensor. If the current range does not contain a sensor wavelength, the range can be skipped or, at least, scanned rapidly, at step 812. If the current range contains a sensor wavelength, a determination is made, at step 808, as to whether the corresponding sensor is a high or low-resolution sensor.

If the sensor is a low-resolution sensor, the range may be scanned with a relatively fast sweep range (but slower than that used to sweep a deadband), at step 810. If the sensor is a high-resolution sensor, the range may be scanned with a relatively slow sweep range, at step 814. The operations may be repeated until all ranges have been swept.

Figure 9:
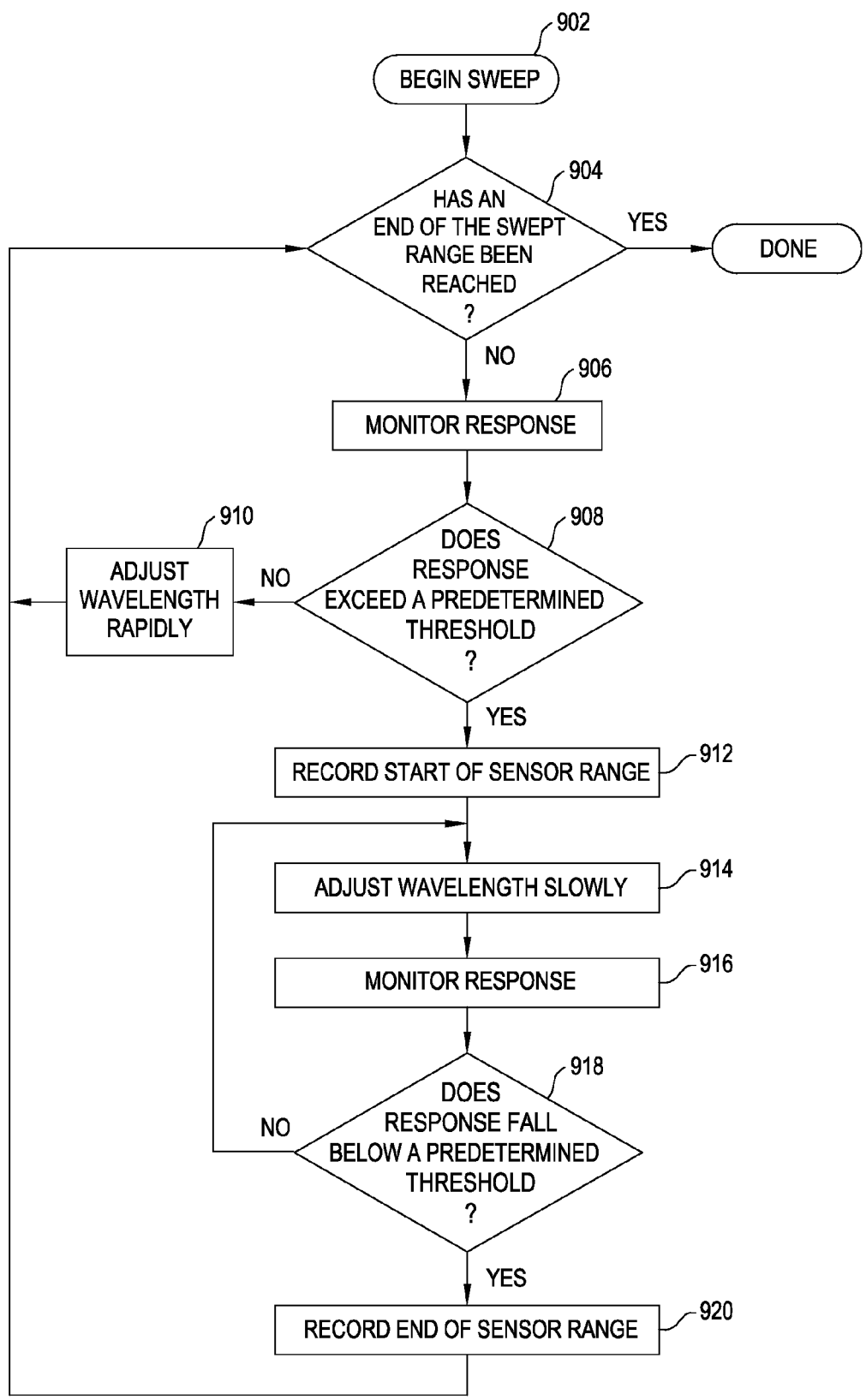
FIG. 9 is a flow diagram of exemplary operations for automatically discovering a sensor topology during a sweep of a range of wavelengths.

FIG. 9 is a flow diagram of exemplary operations for automatically discovering a sensor topology during a sweep of a range of wavelengths. The operations may be performed, for example, as an initial operation to determine the types of sensors that are present in an optical system without requiring field personnel to enter corresponding data manually. In some cases, sensor vendors may sell sensors with known characteristic wavelengths (or wavelength ranges), allowing corresponding data to be pre-stored in the system. In such cases, if the characteristic wavelengths are automatically detected during a sweep, it may be a simple matter of looking up the actual device characteristics, such as the response changes in wavelength as a function of a corresponding measurand (e.g., pressure, temperature, strain, and the like).

At step 902, a sweep of a wavelength range begins. At step 904, a determination is made as to if the end of the range has been reached. If not, the optical response is monitored (or continues to be monitored), at step 906. At step 908, if the monitored response does not exceed a predetermined threshold (e.g., indicating the absence of a characteristic wavelength at or near the current swept wavelength), the wavelength may be adjusted rapidly, at step 910.

On the other hand, if the monitored threshold exceeds a predetermined threshold (e.g., indicating a characteristic wavelength at or near the current swept wavelength), the start of a sensor range may be recorded, at step 912. Because the current wavelength may be at or near a characteristic sensor wavelength, the wavelength may be adjusted slowly, at step 914, while continuing to monitor the optical response, at step 916. The sensor range may include all wavelengths for which the monitored response remains above the predetermined threshold. If the monitored response falls below the predetermined threshold (in some cases allowing for some amount of hysteresis), as determined at step 918, the end of the sensor range may be recorded, at step 920. The operations may be repeated until the entire range has been swept.

Those skilled in the art will also recognize that different aspects described herein may be combined, for some embodiments. As an example, for some embodiments, wavelength sweep control logic may be configured to perform different combinations of operations shown in the flow diagrams described above, to provide different combinations of features.

Amplifier Configuration for a Bragg Grating Interrogator

For some embodiments, an amplified spontaneous emission (ASE) source may be utilized as the optical source 110 for interrogating the optical elements. Spontaneous emission can occur in an optical fiber when electrons in an upper energy level decay to a lower energy level, spontaneously emitting photons in all directions. Some of these photons are emitted in a direction falling within the numerical aperture of the fiber such that these particular photons are captured and guided by the fiber. In a doped optical fiber, the captured photons from the initial spontaneous emission may then interact with dopant ions and consequently be amplified by stimulated emission, hence the term "amplified spontaneous emission." Accordingly, ASE may be considered as light, produced by spontaneous emission, that has been optically amplified by the process of stimulated emission in a gain medium.

However, the spectral power density of typical ASE sources is low compared to ordinary laser output power densities. In swept-wavelength grating interrogation systems, such low ASE source output spectral power density can strain the optical power budget, thereby limiting the maximum sensor reach.

Historically, this problem has been addressed by a number of approaches having varying success and a number of disadvantages. One approach has been to work within the constraints of the resulting optical power budget by employing highly sensitive receivers. However, such receivers can be expensive, and the improvements are limited. Another approach has been to simply try to increase the output power of the ASE source.

Figure 10:
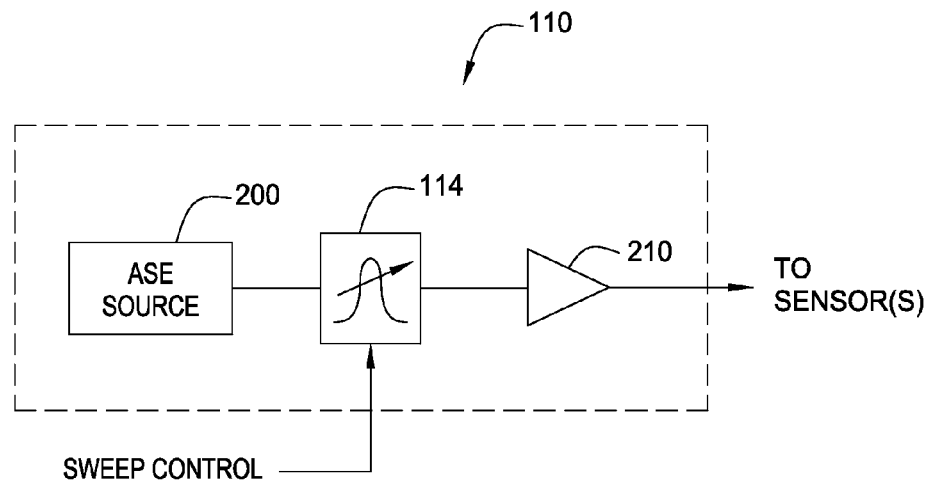
FIG. 10 illustrates an exemplary wavelength sweeping optical source utilizing an amplified spontaneous emission (ASE) source, a tunable filter, and an amplifier.

To overcome these problems, FIG. 10 illustrates an exemplary wavelength sweeping optical source utilizing an ASE source 200, a tunable filter 114, and an amplifier 210. As described above, ASE is produced when a gain medium is stimulated (e.g., pumped) to produce a population inversion. The ASE source 200 may comprise an optical fiber doped with dopant ions and having a length of several meters as the laser gain medium. For example, the core of a silica fiber may be doped with trivalent erbium ions ($Er^{+3}$) to fabricate an erbium-doped fiber. Pumping may be achieved with electrical currents (e.g., produced by semiconductors, or by gases via high-voltage discharges) or with light, generated by discharge lamps or by other lasers (e.g., semiconductor lasers). A laser used to pump a doped fiber is known as a pump laser.

The tunable filter 114 may function as described above to produce a narrow band (i.e., range) of wavelengths from the broadband ASE source 200. The narrow wavelength band passing through with little or no attenuation may be adjusted as the filter 114 is tuned. For some embodiments, the tunable filter 114 may be controlled by the sweep control unit 140 as described above.

The amplifier 210 may boost the narrow band swept-wavelength signal from the tunable filter 114 and output the amplified signal for interrogation of the optical elements, such as the transmissive optical elements 120 or the reflective sensor elements 122 described above. For example, the amplifier 210 may provide a gain of 30 dB, such that 20 to 50 µW may be amplified to 20 to 50 mW. Using the amplifier 210 after the tunable filter 114 may provide for a substantial increase in the output signal level of the optical source, independent of the constraint to prevent lasing in the ASE source 200.

The amplifier 210 may comprise an optical amplifier, which amplifies a light signal directly. For some embodiments, the optical amplifier may comprise a doped fiber amplifier (DFA). A DFA is an optical amplifier that uses a doped optical fiber as a gain medium to amplify an optical signal. In a typical DFA, the optical signal to be amplified and light from a pump laser (pump light) are multiplexed into the doped fiber, and the signal is amplified through interaction with the dopant ions. More specifically, the pump light excites the dopant ions to higher energy levels (orbits), and the input optical signal stimulates the excited dopant ions to release excess energy as photons in phase and at the same wavelength as the input signal. The doped fiber may comprise erbium ions to produce an erbium-doped fiber (EDF), although dopant ions of thulium, praseodymium, or ytterbium have also been implemented.

For other embodiments, the optical amplifier may comprise a semiconductor optical amplifier (SOA). An SOA is typically made from group III-V compound semiconductors, such as GaAs/AlGaAs, InP/InGaAs, InP/InGaAsP, and InP/InAlGaAs. Although an SOA is generally less expensive than a DFA and can be integrated with semiconductor lasers, current SOAs have higher noise, lower gain, moderate polarization dependence, and high nonlinearity with fast transient time. However, an SOA may provide for gain in different wavelength regions than a DFA.

By amplifying the narrow band swept-wavelength emission from the ASE source 200 as illustrated in FIG. 10, the limitations on the optical power budget may be resolved, and the ASE source 200 may be suitable for use in a swept-wavelength optical sensor system.

Figure 11:
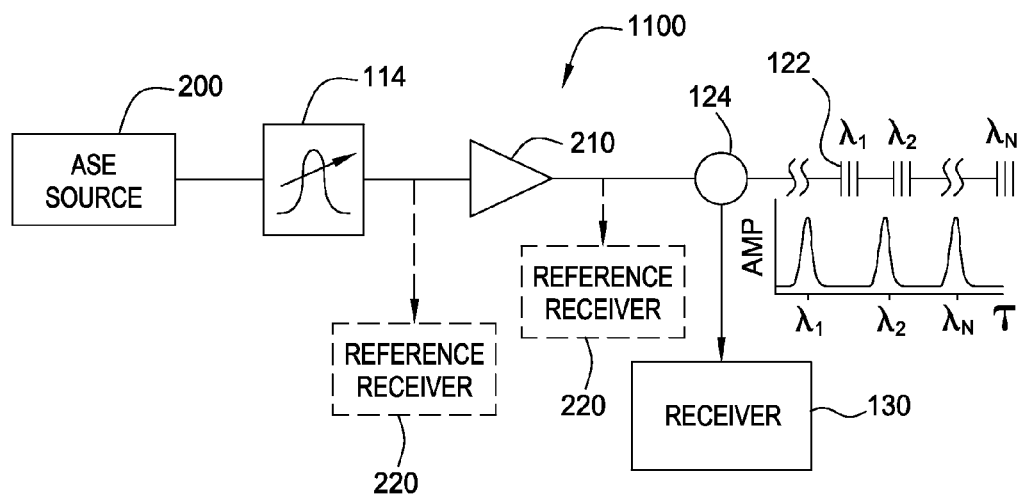
FIG. 11 illustrates an exemplary reflective optical sensor system with the optical source of FIG. 10.

FIG. 11 illustrates an exemplary reflective optical sensor system 1100 employing the optical source 110 of FIG. 10. This system 1100 is similar to the reflective optical sensor system 100 of FIG. 1B and includes the bi-directional coupler 124, the reflective sensor elements 122, and the receiver 130. Interrogating optical signals produced by tuning and amplifying light emitted from the ASE source 200 may be directed to the reflective sensor elements 122 (e.g., fiber Bragg gratings, or FBGs) via the bi-directional coupler 124. The coupler 124 may also direct response signals reflected from the reflective sensor elements 122 to the receiver 130 for optical detection and signal processing. For some embodiments, the coupler 124 may be replaced with an optical circulator.

Some embodiments may include an optional reference receiver 220 in an effort to monitor optical signals produced by or internal to the optical source 110. The reference receiver 220 may monitor optical signals before and/or after the amplifier 210 as shown. The reference receiver 220 may incorporate a reference element 116 as described above. The optical signals may be directed to the reference receiver 220 via a splitter (not shown), similar to the splitter 126 of FIG. 1B. The reference receiver 220 may be independent from the receiver 130 or may be incorporated (at least partially) into the receiver 130.

For some embodiments, the reflective sensor elements 122 may comprise cane-based gratings, where the gratings are inscribed in a large diameter waveguide (referred to as a "cane waveguide") rather than in an optical fiber. Cane waveguides have a core and a cladding just as do standard fibers. In fact, the core of a single mode cane is generally the same diameter as the core of a single mode standard fiber, typically 7 to 12 µm (microns). However, cane is thicker and sturdier than fiber because of the substantial amount of cladding. While a standard fiber has a diameter of 125 µm, cane typically ranges from 0.3 mm to about 4 mm, the great bulk of which constitutes cladding. The cane's relatively thick cladding provides significant mechanical benefits over fiber. Furthermore, a cane does not require a protective buffer layer and, thus, eliminates manufacturing complexity.

Figure 12:
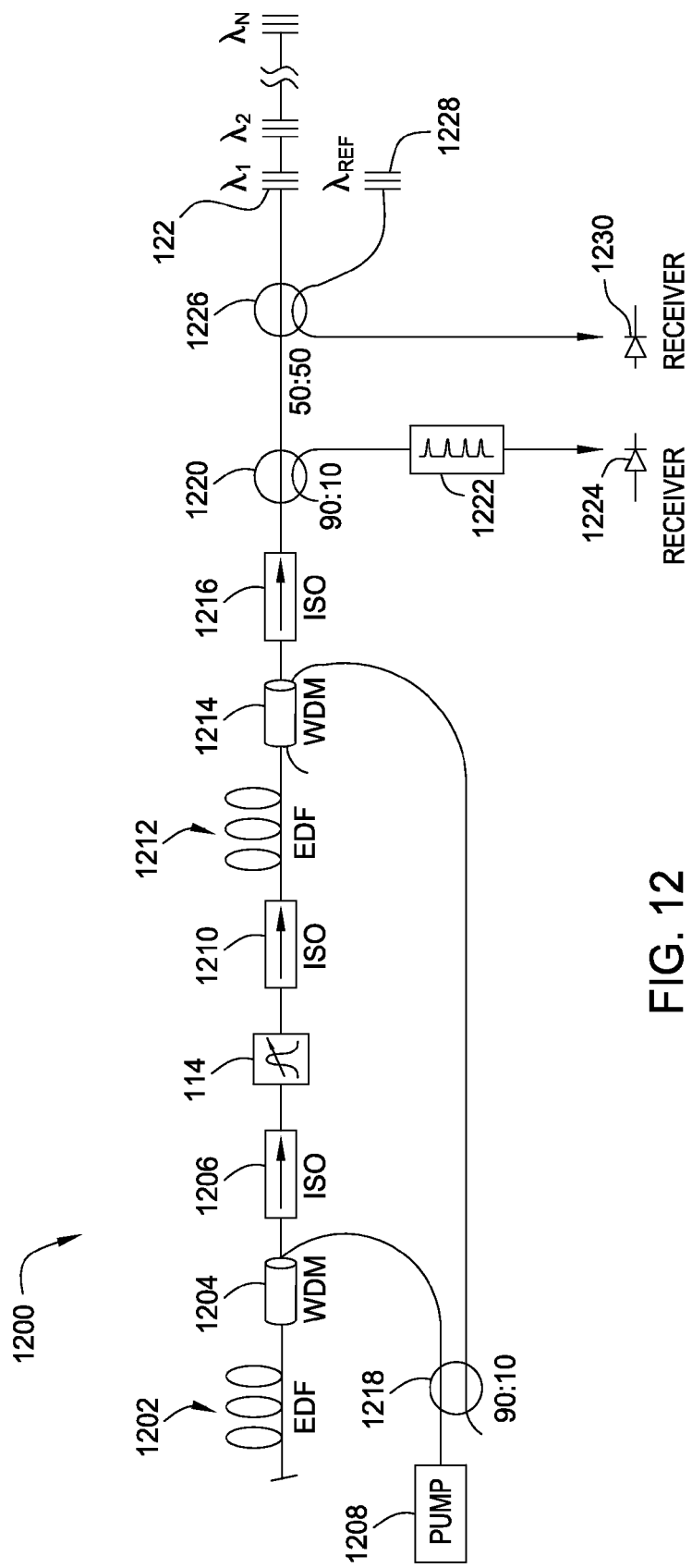
FIG. 12 illustrates an exemplary reflective optical sensor system with an exemplary ASE source and an exemplary optical amplifier.

FIG. 12 illustrates an exemplary reflective optical sensor system 1200 with an exemplary ASE source and an exemplary optical amplifier. The ASE source may comprise an erbium-doped fiber (EDF) 1202, a wavelength-division multiplexer (WDM) 1204 with an optical isolator 1206, and a pump laser 1208 as shown. Decay of electrons in the upper energy level may cause spontaneous emission of photons within the EDF 1202. Pump light from the pump laser 1208 may be multiplexed into the EDF 1202 via the WDM 1204 to excite erbium ions to higher energy levels (orbits) in the EDF. The spontaneously emitted photons may stimulate the excited erbium ions to release excess energy as photons, such that the EDF 1202, the WDM 1204, and the pump laser 1208 function as an ASE source.

The ASE source may be coupled to the tunable filter 114 via the optical isolator 1206, which directs the light emitted by the ASE source to the filter and blocks light reflected from the filter. The tunable filter 114, in turn, may be coupled to the optical amplifier via another optical isolator 1210. This optical isolator 1210 may direct filtered light to the optical amplifier and block backwards scattered ASE light from the optical amplifier.

The optical amplifier may comprise an erbium-doped fiber (EDF) 1212, a wavelength-division multiplexer (WDM) 1214 with an optical isolator 1216, and a pump laser. As depicted in FIG. 12, the ASE source and the optical amplifier may share the same pump laser 1208, and a splitter 1218 may be used to direct a portion of the pump light to the ASE source and the remaining portion to the optical amplifier. For some embodiments, the splitter 1218 may be a 90:10 splitter or an 80:20 splitter. For example, the 90:10 splitter may direct 90% of the pump light to the ASE source and 10% to the optical amplifier. Since the optical signal input to the amplifier is low (e.g., 20 to 50 µW), only a small amount of power may be required to pump the amplifier, substantially less power than is used for ASE. Consequently, the same pump laser 1208 may be used for pumping both the ASE source and the optical amplifier.

In the amplifier of FIG. 12, the narrow wavelength range optical signal from the tunable filter 114 and pump light from the pump laser 1208 may be multiplexed into the EDF 1212 via the WDM 1214 to excite erbium ions to higher energy levels (orbits) in the EDF. The input optical signal may stimulate the excited erbium ions to release excess energy as photons, such that the EDF 1212, the WDM 1214, and the pump laser 1208 function as an erbium-doped fiber amplifier (EDFA). The WDM 1214 may be coupled to the isolator 1216, such that the amplified optical signal may be directed to the optical sensor elements, but the pump light is blocked.

The optical sensor system 1200 may include a splitter 1220 (e.g., a 90:10 splitter) for directing a portion of the amplified optical signal to a comb filter 1222 and a reference receiver 1224. The comb filter 1222 may produce a reference spectrum having spectrum peaks with a constant, known frequency separation for use as an "optical ruler" during signal processing of the response signals reflected from the sensor elements 122.

A remaining portion of the amplified optical signal may be directed to an optical coupler 1226. The optical coupler 1226 may direct a portion (e.g., half) the amplified optical signal to the reflective sensor elements 122, and a remaining portion (e.g., the other half) to a reference Bragg grating 1228. Light reflected by the reflective sensor elements or the Bragg grating 1228 may be passed back through the optical coupler 1226 and directed to the sensor receiver 1230 for conversion to electrical signals (via a photodiode, for example) and further signal processing. In this manner, accurate sensor measurements may be performed for measuring parameters such as temperature, pressure, and/or strain.

Interrogating WDM/TDM Sensors Using FDML Techniques

As a practical matter, the number of optical elements (e.g., fiber Bragg gratings) that can be used in a single interrogation system is limited by the ability of the interrogating instrument to distinguish between the optical elements. Wavelength division multiplexing (WDM) and time division multiplexing (TDM) have been used to distinguish between gratings by wavelength and time, respectively. However, even more optical elements could be distinguished if both WDM and TDM were enabled on the same optical waveguide by the interrogating instrument.

Accordingly, some embodiments of the present invention provide for adding (or, in some cases, simply relocating) a swept-wavelength tunable optical filter in front of the receiver of an interrogator system. In this manner, it is possible to filter out optical signals received from the optical elements that do not result from the wavelength and time slot of interest during a wavelength sweep. Such embodiments provide for both WDM and TDM of the optical elements, which enables many more optical elements to be distinguished and added to an optical waveguide, such as an optical fiber. Moreover, such embodiments have the added benefit of filtering out Rayleigh scattering and connector back-reflections from the optical fiber transmitting the signals, thereby allowing ultra long reach sensing to be achieved.

Figure 13A:
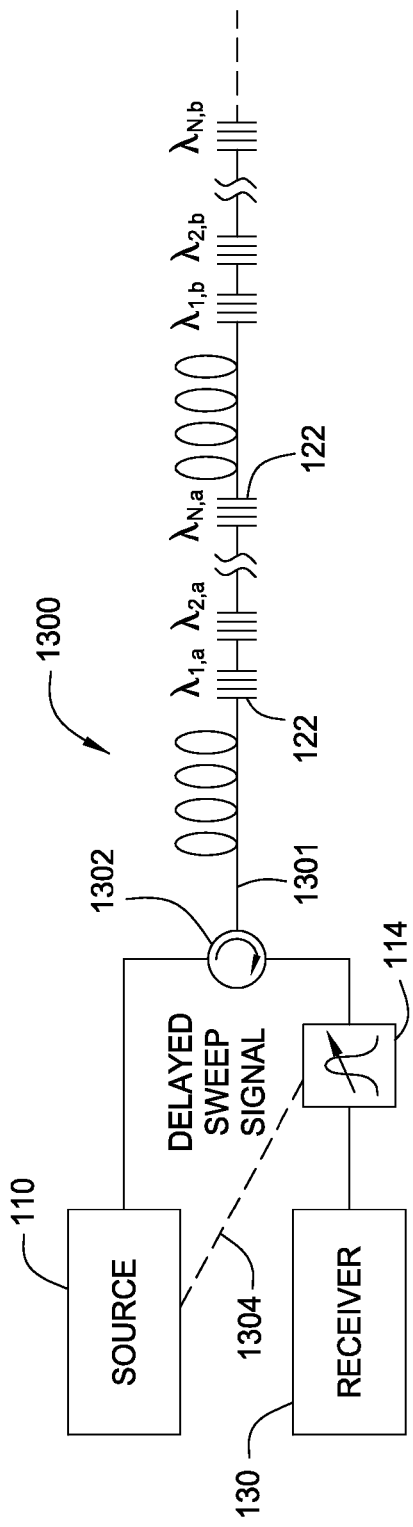
FIGS. 13A-B illustrate exemplary reflective optical sensor systems for swept-wavelength interrogation with a tunable filter located between a circulator and a receiver in an effort to filter out reflected signals that do not arise from the wavelength and time slot of interest during a sweep.

For example, FIG. 13A illustrates an ultra long reach optical interrogator system 1300 using reflective sensor elements 122, such as fiber Bragg gratings (FBGs) written in an optical fiber 1301. Although transmissive optical elements 120 may replace the reflective sensor elements 122 in some embodiments using both WDM and TDM, the remainder of the specification will refer to only reflective sensor elements for ease of description.

The reflective sensor elements 122 may have various characteristic wavelengths $\lambda_1$ to $\lambda_N$ for WDM, where N is the maximum number of discrete characteristic wavelengths in an optical waveguide. Furthermore, characteristic wavelengths of the reflective sensor elements 122 may be repeated one or more times on the same optical fiber 1301, thereby implicating TDM, as well. As illustrated in FIG. 13A, the optical fiber may have at least two reflective elements with the same characteristic wavelength (e.g., $\lambda_{2,a}$ and $\lambda_{2,b}$ or $\lambda_{N,a}$ and $\lambda_{N,b}$), which may be separated by a length of optical fiber. Because these reflective sensor elements 122 are positioned at different locations along the optical fiber 1301, the interrogator system may most likely be able to distinguish between them in time using TDM, even though these elements have the same characteristic wavelength. However, the various characteristic wavelengths need not be repeated the same number of times on the optical fiber or be arranged in any order (e.g., ascending or descending wavelength). In fact, separating reflective sensor elements 122 with closely-valued characteristic wavelengths along the optical fiber may offer better distinguishing ability, especially in instances where the optical filter has a wide wavelength passband and the characteristic wavelengths are close together (i.e., have small differences in wavelength). Also, repeated characteristic wavelengths of a reflective sensor element group need not follow the arrangement order of another group.

In the interrogator system 1300 of FIG. 13A, the optical source 110—which may include any of the embodiments described above—may be coupled to an optical circulator 1302 for delivering the swept-wavelength optical signal to the reflective sensor elements 122. Signals reflected from the sensor elements 122 may be directed by the circulator 1302 to a tunable optical filter 114 and the receiver 130 for signal processing. As the optical source 110 outputs different wavelengths of light during a sweep, the tunable optical filter 114 may have a narrow bandpass wavelength range that filters out reflected signals that are not due to the sourced wavelength from reaching the receiver 130. These blocked optical signals include reflections from sensor elements having characteristic wavelengths different from the sourced wavelength during a particular period. Furthermore, the tunable wavelength passband of the optical filter 114 may be adjusted according to a sweep function to follow the changes in the wavelength emitted by the swept-wavelength optical source 110. Because the filter's passband may be adjusted in time according to the sweep function, the tunable filter 114 may also filter out reflected signals that do not result from the desired time slot from reaching the receiver 130. These blocked signals may not only include back-reflections from, for example, optical connectors, circulators, couplers, and/or other reflective sensor elements, but also Rayleigh scattering within the optical fiber 1301.

The tunable optical filter 114 may be synchronized to sweep (i.e., adjust the tunable passband) with a delay in relation to the source wavelength sweep. As illustrated in FIG. 13A, the delayed sweep signal 1304 may link the wavelength sweep of the optical source 110 to the tuning of the filter 114. For some embodiments, delay may be constant and may be set approximately equal to the round trip travel time down to the first reflective sensor element 122 and back again. For other embodiments, the delayed sweep signal 1304 may be wavelength-dependent such that for a given wavelength i, the delay may be set approximately equal to the round trip travel time down to the first reflective sensor element 122 having that particular characteristic wavelength ($\lambda_i$). Still other embodiments may not include a delay between the sourced wavelength sweep and the tuning of the reflected-signal filter. The delay may also be changed over time in order to receive signals from other reflective sensor elements located with different round trip travel times.

Figure 13B:
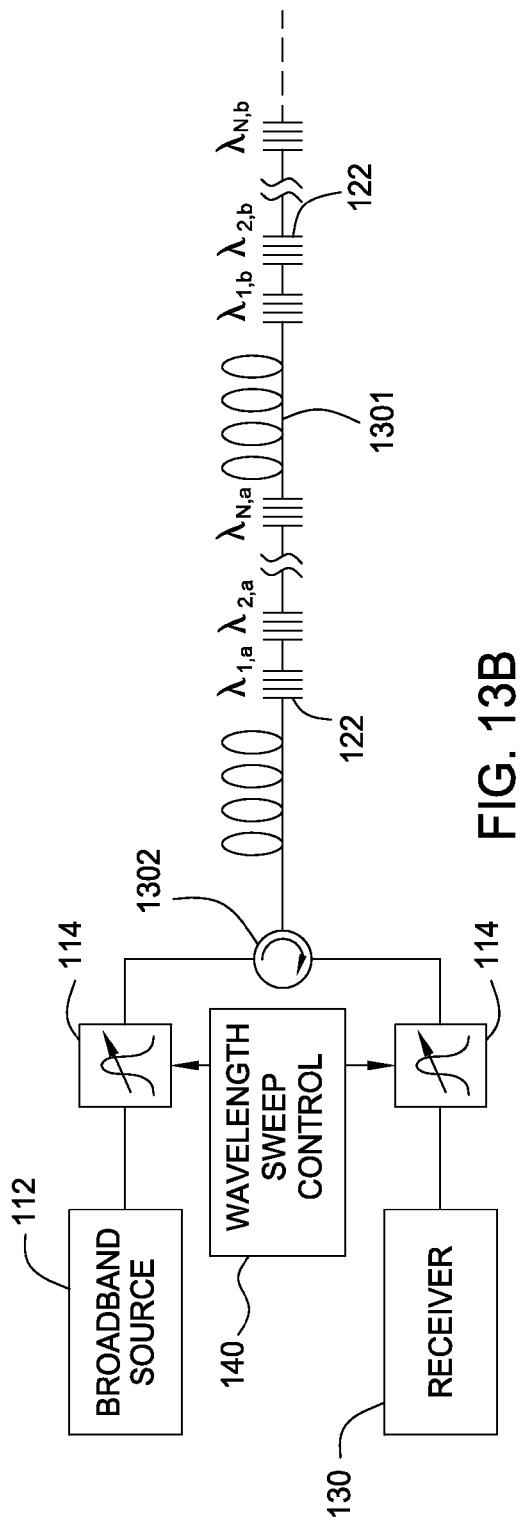

For some embodiments as illustrated in FIG. 13B, the wavelength-swept optical source 110 may be replaced by a broadband source 112 emitting broadband light and a second tunable optical filter 114 for filtering the broadband light to produce wavelength-swept light. For such embodiments, wavelength sweep control of the source filter after the broadband source 112 and the passband adjustment of the reflected-signal filter before the receiver 130 may be managed by a sweep control unit 140, similar to those described above. The sweep control unit 140 may provide no delay, a constant delay, a time-dependent delay, or a wavelength-dependent delay as described above between the source filter and the reflected-signal filter.

Figure 13C:
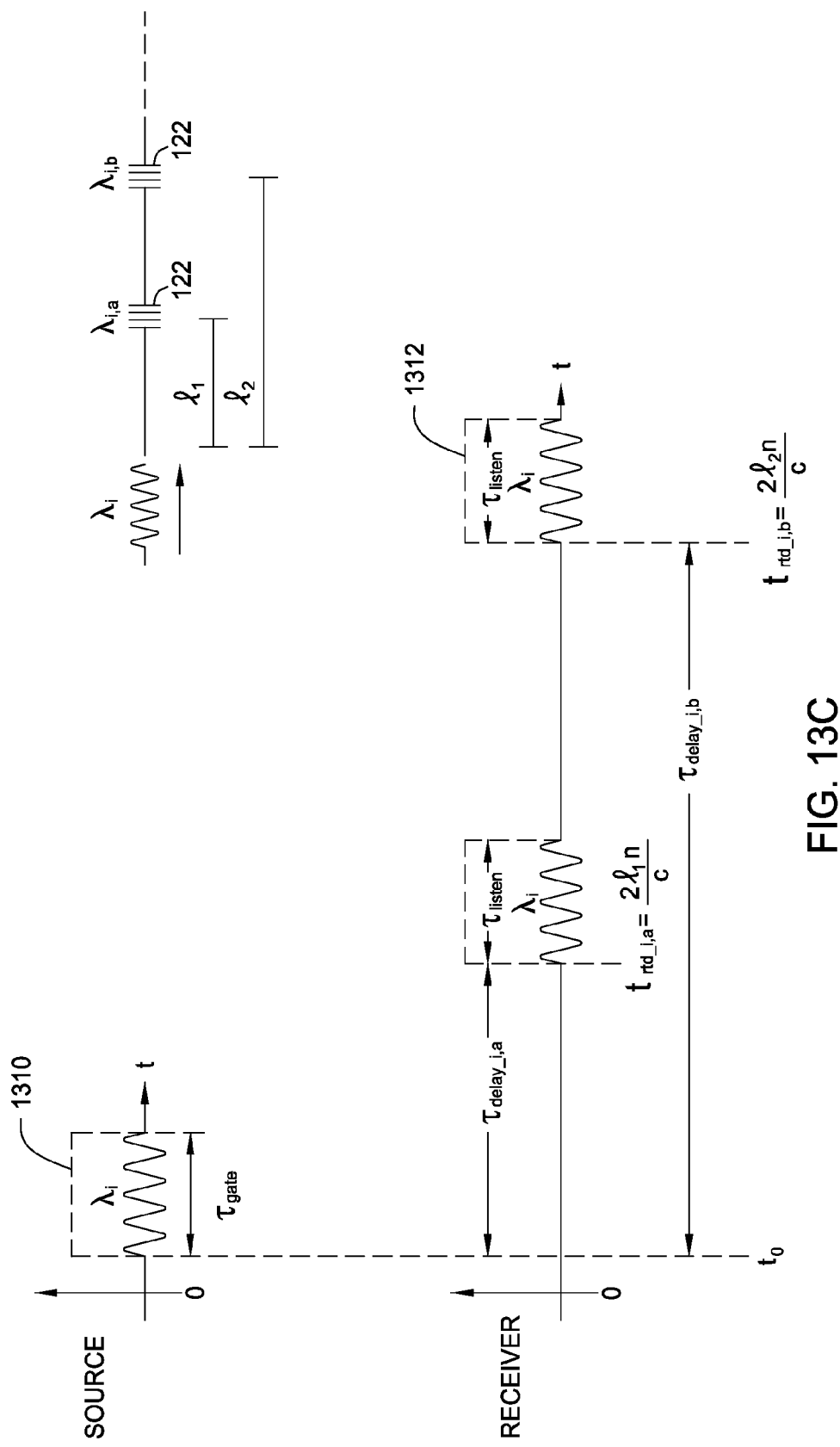
FIG. 13C illustrates the timing of sourcing an optical signal of wavelength i during a sweep window into an optical waveguide having two reflective sensor elements with a characteristic wavelength i and receiving the reflected optical signals after filtering, in accordance with FIG. 13A or 13B, for example.

FIG. 13C illustrates the wavelength-swept interrogation timing, in accordance with the embodiments of FIG. 13A or 13B, for example, for an optical waveguide having two reflective sensor elements 122 with a characteristic wavelength i. The optical waveguide may comprise more than two reflective sensor elements, but two elements will suffice for this explanation. The first reflective sensor element with characteristic wavelength i ($\lambda_{i,a}$) is positioned at a first length $l_1$ down the optical waveguide away from the source 110 and the receiver 130, assuming that the source and the receiver are the same distance away from the first reflective sensor element. The second reflective sensor element with characteristic wavelength i ($\lambda_{i,b}$) is positioned at a second length $l_2$ down the optical waveguide away from the source 110 and the receiver 130.

At a certain time $t_0$, the wavelength-swept optical source 110 may begin emitting light at (or in a range containing) the particular characteristic wavelength i during the sweep. The source may emit at wavelength i for a gating period of time $\tau_{gate}$ defining a sweep window 1310. For simplicity of illustration and explanation, the other wavelengths or wavelength ranges emitted during the sweep at prior or subsequent times are not shown in FIG. 13C. The sourced light at wavelength i may travel down to the reflective sensor elements 122, a first portion of the light may be reflected by the first sensor element (i.e., the nearest sensor element) at characteristic wavelength i ($\lambda_{i,a}$), and a second portion of the light may be reflected by the second sensor element (i.e., the next closest sensor element) at characteristic wavelength i ($\lambda_{i,b}$).

At the receiver 130, the first portion of the light will have traveled a round trip distance of $2l_1$. Therefore, if the refractive index of the optical waveguide is n, the round trip delay for the first portion of the reflected light to reach the receiver is:

$$t_{rtd\_i,a} = \frac{2l_1 n}{c}$$

where c is the speed of light in a vacuum. This round trip delay is the time the receiver can expect to receive the first reflected optical signals from the interrogation of the reflective sensor elements at characteristic wavelength i. The second portion of the light will have traveled a round trip distance of $2l_2$. Therefore, the round trip delay for the second portion of the reflected light to reach the receiver is:

$$t_{rtd\_i,b} = \frac{2l_2 n}{c}.$$

This round trip delay is the time the receiver can expect to receive the second reflected optical signals from the interrogation of the reflective sensor elements at characteristic wavelength i.

A listening window ($\tau_{listen}$) 1312 may be defined as the time during which the tunable optical filter 114 for filtering the reflected optical signals is tuned to have a passband encompassing a particular characteristic wavelength of interest (i.e., the peak wavelength of a reflective sensor element 122). The listening window 1312 may also be considered as encompassing a particular distance window from which reflected signals will return to the tunable optical filter 114 with the correct delay in order to pass through the tunable optical filter 114, typically for all wavelengths covered by the sweep. In cases where the distance window is short enough (or the separation great enough) such that only one of $\lambda_{i,a}$ and $\lambda_{i,b}$ is encompassed by the listening window 1312, the sensor elements 122 may be separately interrogated by adjusting the tunable filter 114 to different delays (e.g., $\tau_{delay\_i,a}$ and $\tau_{delay\_i,b}$), hence achieving time-division multiplexing of the sensors. Multiple sensor elements 122 with different wavelengths may be interrogated within the same listening window as their return signals will be distributed in time at the receiver 130 due to the swept wavelength of the source, allowing wavelength-division multiplexing of sensors.

For embodiments without a delay between the source and receiver filtering, (e.g., with a tunable filter that filters both the outgoing and returning optical signals), the sweep period ($\tau_{sweep}$) may most likely be set to match or be a harmonic of the round-trip time from the source 110 to the sensor element of interest and back to the receiver 130. For an optical fiber 1301 having a refractive index n=1.5 and the furthest reflective sensor element positioned 100 km away from the receiver 130, $\tau_{sweep}$=1.0 ms (=2*100 km*1.5/3.0×10$^8$ m/s). Therefore, the sweep rate may be set to 1 kHz or a harmonic thereof (e.g., 2 kHz).

For other embodiments, the delay may be set to match the round-trip time from the source to a sensor element of interest and back to the receiver. For some embodiments, the delay may be changed from time-to-time or over time in order to receive signals from different sensor elements of interest located at various distances from the source and receiver.

This technique for setting the sweep rate of the tunable optical filter is similar to Fourier domain mode locking (FDML) techniques for constructing a laser. Such techniques are disclosed in U.S. Patent Application No. 2006/0187537 to Huber et al., entitled "Mode Locking Methods and Apparatus" and filed Jan. 20, 2006, and in R. Huber, M. Wojtkowski, and J. G. Fujimoto, "Fourier Domain Mode Locking (FDML): A new laser operating regime and applications for optical coherence tomography," *Optics Express*: Vol. 14, No. 8, 17 Apr. 2006, pp. 3225-37. In constructing an FDML laser, "a narrowband optical bandpass filter is driven periodically with a period matched to the optical round-trip time of the laser cavity, or a harmonic thereof." In other words, the sweep period $\tau_{sweep}$ of the FDML laser is dependent on the length of the ring cavity. In embodiments of the present invention, however, $\tau_{sweep}$ is dependent on the length to the sensing elements along the length of an optical waveguide disposed down a borehole, for example.

It may also be noted that Rayleigh scattering and back-reflections outside the time slot of the listening window may be filtered from the reflected optical signals. Therefore, their limitation on the optical budget or system range may be significantly reduced. In embodiments of the present invention, Rayleigh scattering may be filtered out by a factor equal to $$\frac{\Delta\lambda_{filter}}{\Delta\lambda_{sweep} \frac{\Delta t_{delay}}{\Delta t_{sweep}}}$$

where $\Delta\lambda_{filter}$ is the spectral width of the tunable optical filter 114, $\Delta\lambda_{sweep}$ is the wavelength range of the sweep over which the filter is tuned, $\Delta t_{delay}$ is the time delay between the swept source arriving at a particular wavelength and the receiver's tunable filter reaching the same wavelength, and $\Delta t_{sweep}$ is the length of time for the tunable filter to return to a given start position and be traveling in the same wavelength tuning direction during its normal sweeping operation.

Figure 14:
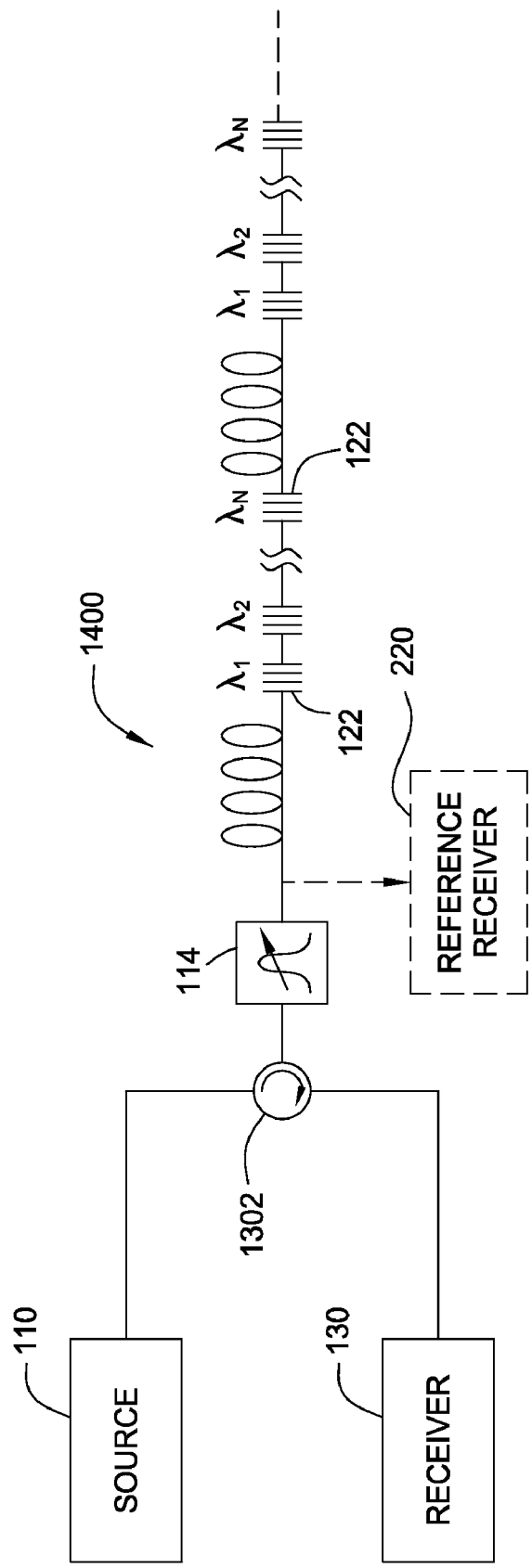
FIG. 14 illustrates an exemplary reflective optical sensor system for swept-wavelength interrogation with a tunable filter located between the reflective sensor elements and a circulator in an effort to filter out reflected signals that do not arise from the wavelength and time slot of interest during a sweep before such signals reach the receiver.

FIG. 14 illustrates another example of a reflective optical sensor system 1400 for swept-wavelength interrogation. In relation to FIG. 13A, the tunable optical filter 114 of FIG. 14 has been moved between the circulator 1302 and the reflective optical elements 122. The tunable filter 114 in such a configuration may most likely possess low back-reflection for the system to be effective. Still, however, the tunable optical filter 114 may filter the optical signals reflected by the sensor elements 122 as described above before the reflected signals reach the receiver 130 via the circulator 1302.

Some embodiments may include an optional reference receiver 220 in an effort to monitor the swept-wavelength optical signals being transmitted to the reflective sensor elements 122. The reference receiver 220 may incorporate a reference element 116 as described above. The optical signals may be directed to the reference receiver 220 via a splitter (not shown), similar to the splitter 126 of FIG. 1B. The reference receiver 220 may be independent from the receiver 130 or may be incorporated (at least partially) into the receiver 130.

As shown in FIGS. 15A-B, the tunable optical filter 114 may be located within the effective cavity of the light source for some embodiments. In FIG. 15A, for example, an optical gain element 1502 is disposed between a reflecting endplate 1504 (e.g., a mirror) and the reflective sensor elements 122 forming the resonator of a laser. The tunable optical filter 114 may be used to both tune the wavelength of the sweep and to filter the reflected optical signals. The reflected optical signals may be routed to the receiver 130 and an optional reference receiver 220 via one or more optical couplers 124.

As illustrated in FIG. 15B, the optical gain element 1502 may comprise a gain medium 1506 and a pump laser 1208 as described above. The receiver 130 may comprise a sensor receiver 1230, also as described above. For some embodiments, the reflective sensor elements 122 may be disposed on multiple optical fibers as shown. However, reflective sensor elements with the same characteristic wavelength should be positioned at different locations along the various optical fibers, as illustrated in FIG. 15B, such that reflections from these same-wavelength elements occur at different times and preferably do not overlap. In this manner, the reflections from these same-wavelength elements can be distinguished from one another using TDM.

One way to solve this potential problem may be to change the order of the reflective sensor elements on the different optical fibers. For example, the order according to characteristic wavelength of the reflective sensor elements on one fiber could be reversed on a second fiber, as illustrated in FIG. 16B, as long as sensor elements at the middle of the two optical fibers having the same characteristic wavelength did not overlap. Another way to ensure sensor elements with the same characteristic wavelength are positioned at different locations along the various optical fibers may be to shift the reflective sensor elements 122 on one fiber with respect to a second fiber.

Figure 16A:
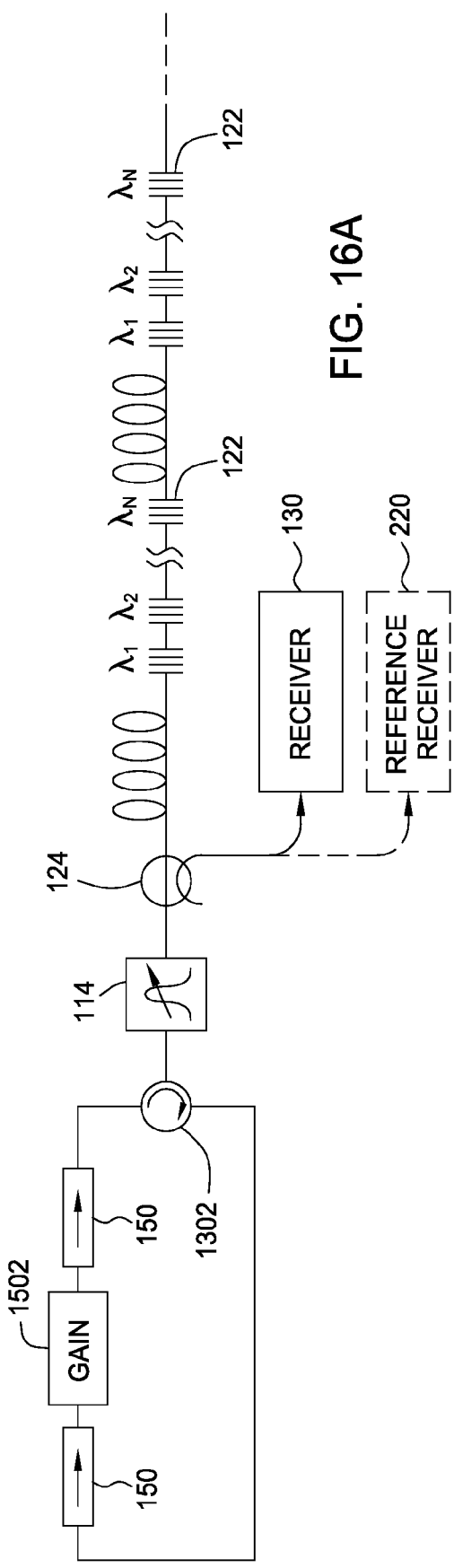
FIG. 16A illustrates an exemplary reflective optical sensor system for swept-wavelength interrogation with a tunable filter located between the reflective sensor elements and a circulator in an effort to filter out reflected signals that do not arise from the wavelength and time slot of interest during a sweep.
Figure 16B:
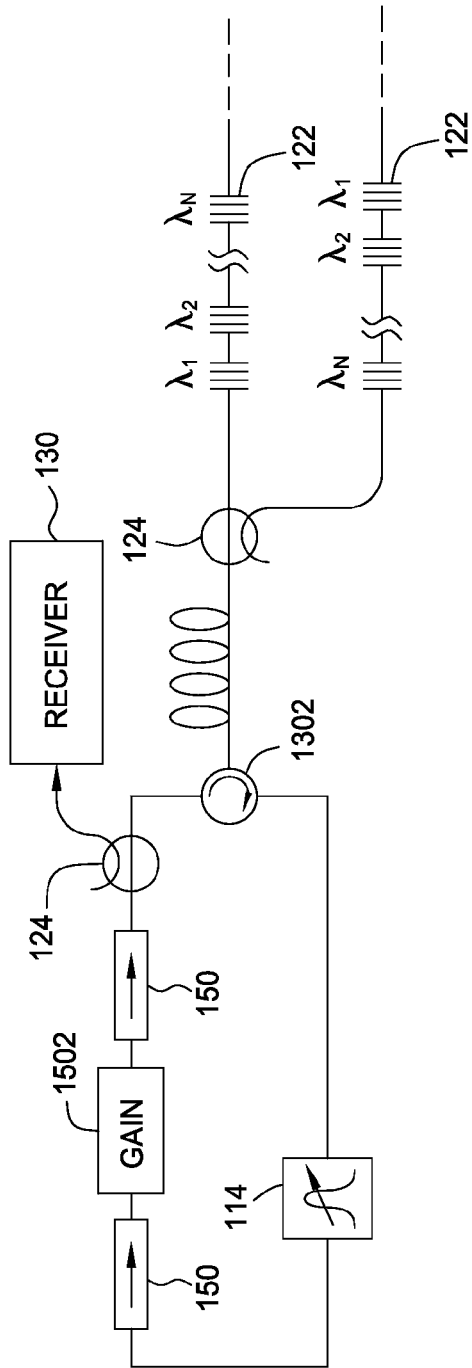
FIG. 16B illustrates an exemplary reflective optical sensor system for swept-wavelength interrogation with a tunable filter located in the effective ring cavity of the light source in an effort to filter out reflected signals that do not arise from the wavelength and time slot of interest during a sweep.

The embodiment of FIG. 16A is similar to FIGS. 15A-B, but the resonator using the reflecting endplate 1504 has been replaced with a ring cavity using the optical gain element 1502 and isolators 150 on either side of the gain element. In addition, an optical circulator 1302 directs light emitted from the ring cavity to the tunable optical filter 114 and the reflective sensor elements 122 and directs the reflected optical signals back into the ring cavity. Thus, the reflected light may be directed back into the ring cavity for further stimulated emission within the gain element 1502. Here again, the tunable optical filter 114 may be used to both tune the wavelength of the sweep and to filter the reflected optical signals. The reflected optical signals may be routed to the receiver 130 and an optional reference receiver 220 via one or more optical couplers 124.

For some embodiments, as illustrated in FIG. 16B, the tunable optical filter 114 may be located anywhere along the ring cavity of the light source. Here again, the tunable optical filter 114 may be used to both tune the wavelength of the sweep and to filter the reflected optical signals. Furthermore, for some embodiments, the receiver 130 may be coupled to the ring cavity via an optical coupler 124.

The operations, calculations, and timing described above with respect to FIGS. 13A-C may also apply to the embodiments of FIGS. 14-16B. In some of these embodiments using only a single tunable optical filter 114 for both the source sweep and the reflected signals, however, a delay between changing the sweep wavelength and adjusting the passband of the filter for the reflected optical signals may not be possible. In other words, the delay may be zero for such embodiments.

While the foregoing is directed to embodiments of the present invention, other and further embodiments of the invention may be devised without departing from the basic scope thereof, and the scope thereof is determined by the claims that follow.

The invention claimed is:

1. A method comprising:
providing light, wherein a wavelength of the light is changed according to a sweep function;
interrogating one or more reflective optical elements with the wavelength-swept light to produce reflected optical signals;
filtering the reflected optical signals, wherein a bandpass wavelength range is changed based on the sweep function to follow the changes in the light's wavelength; and
receiving the filtered, reflected optical signals for processing.

2. The method of claim 1, wherein the sweep function comprises a constant sweep rate.

3. The method of claim 2, wherein the sweep rate is set to a round trip frequency or a harmonic thereof, wherein the round trip frequency is equal to a speed of light in an optical waveguide for conveying the optical signals divided by a round trip distance of the light from a light source to the furthest one of the reflective optical elements and back to a receiver via the optical waveguide.

4. The method of claim 1, wherein filtering the reflected optical signals comprises filtering out Rayleigh scattering and back-reflections from an optical waveguide conveying the optical signals.

5. The method of claim 1, further comprising delaying the sweep function before filtering, such that the changing of the bandpass wavelength range is delayed from the changing of the light's wavelength.

6. The method of claim 1, wherein delaying the sweep function comprises delaying the sweep function by a round trip distance of the light, in an optical waveguide for conveying the optical signals, from a light source to one of the reflective optical elements and back to a receiver divided by a speed of light in the optical waveguide.

7. The method of claim 1, wherein filtering the reflected signals comprises tuning an optical bandpass filter.

8. The method of claim 7, wherein providing the wavelength-swept light comprises tuning the same optical bandpass filter.

9. The method of claim 1, wherein providing the wavelength-swept light comprises tuning an optical bandpass filter receiving broadband light.

10. An apparatus comprising:
a light source for providing light and configured to change a wavelength of the light according to a sweep function;
one or more reflective optical elements configured to receive the wavelength-swept light from the light source and to reflect portions of the light at characteristic wavelengths producing reflected optical signals;
a tunable bandpass filter configured to filter the reflected optical signals, wherein a bandpass wavelength range of the filter is changed based on the sweep function to follow the changes in the light's wavelength; and
a receiver for processing the filtered, reflected optical signals.

11. The apparatus of claim 10, wherein the sweep function comprises a constant sweep rate.

12. The apparatus of claim 11, wherein the sweep rate is set to a round trip frequency or a harmonic thereof, wherein the round trip frequency is equal to a speed of light in an optical waveguide for conveying the optical signals divided by a round trip distance of the light from the light source to one of the reflective optical elements and back to the receiver via the optical waveguide.

13. The apparatus of claim 10, further comprising means for delaying the sweep function before filtering, such that the changing of the bandpass wavelength range is delayed from the changing of the light's wavelength.

14. The apparatus of claim 13, wherein the means for delaying the sweep function is configured to delay the sweep function by a round trip distance of the light, in an optical waveguide for conveying the optical signals, from the light source to one of the reflective optical elements and back to the receiver divided by a speed of light in the optical waveguide.

15. The apparatus of claim 10, wherein the light source comprises a tunable laser.

16. The apparatus of claim 10, wherein the light source comprises a broadband light source emitting broadband light and a tunable optical bandpass filter for filtering the broadband light and emitting a portion of the light within an adjustable narrow wavelength range as the changing light's wavelength.

17. The apparatus of claim 10, wherein the tunable filter is configured to change the light's wavelength according to the sweep function.

18. The apparatus of claim 17, wherein the light source is a laser and the tunable filter is disposed within a cavity of the laser.

19. The apparatus of claim 18, wherein the cavity is a ring cavity.

20. The apparatus of claim 18, wherein the receiver is coupled to the cavity via an optical coupler.

21. The apparatus of claim 10, further comprising a circulator for directing the light to the reflective optical elements via the tunable filter and for directing the filtered, reflected optical signals to the receiver.

22. The apparatus of claim 10, further comprising a circulator for directing the light to the reflective optical elements and for directing the reflected optical signals to the tunable filter and the receiver.

23. The apparatus of claim 10, wherein the optical elements comprise fiber Bragg gratings (FBGs).

24. The apparatus of claim 10, wherein reflective optical elements having the same characteristic wavelength are located at different distances, from the receiver, along one or more optical waveguides for conveying the reflected optical signals.

25. The apparatus of claim 10, wherein the light source comprises an amplifier for amplifying light emitted from an amplified spontaneous emission (ASE) source.

* * * * *